United States Patent
Jeanne et al.

(10) Patent No.: US 10,952,528 B2
(45) Date of Patent: Mar. 23, 2021

(54) METHODS AND SYSTEMS FOR EXTRACTING BRUSHING MOTION CHARACTERISTICS OF A USER USING AN ORAL HYGIENE DEVICE INCLUDING AT LEAST ONE ACCELEROMETER TO PROVIDE FEEDBACK TO A USER

(71) Applicant: KONINKLIJKE PHILIPS N.V., Eindhoven (NL)

(72) Inventors: Vincent Jeanne, Bothell, WA (US); Toon Hardeman, S'Hertogenbosch (NL); Arjen Den Hamer, Helmond (NL); Martin John Edwards, Solihull (GB); Jan Wojciech Obrebski, Waalre (NL); Alex Merck, Waalre (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 243 days.

(21) Appl. No.: 15/739,069

(22) PCT Filed: Jun. 28, 2016

(86) PCT No.: PCT/IB2016/053842
§ 371 (c)(1),
(2) Date: Dec. 21, 2017

(87) PCT Pub. No.: WO2017/002004
PCT Pub. Date: Jan. 5, 2017

(65) Prior Publication Data
US 2018/0160796 A1    Jun. 14, 2018

Related U.S. Application Data

(60) Provisional application No. 62/185,926, filed on Jun. 29, 2015.

(51) Int. Cl.
*A46B 15/00* (2006.01)
*A61C 17/22* (2006.01)

(52) U.S. Cl.
CPC ........ *A46B 15/0006* (2013.01); *A46B 15/004* (2013.01); *A46B 15/0012* (2013.01);
(Continued)

(58) Field of Classification Search
CPC ............ A46B 15/0006; A46B 15/0008; A46B 15/0038; A46B 15/004; A46B 15/0012; A61C 17/221
(Continued)

(56) References Cited

U.S. PATENT DOCUMENTS 10,064,711 B1 * 9/2018 Richter .................... A41H 1/02
2002/0183959 A1 12/2002 Savill et al.
(Continued)

FOREIGN PATENT DOCUMENTS

TW         201210529 A    3/2012
WO         2014/142029 A1 9/2014
(Continued)

*Primary Examiner* — Randall E Chin

(57) ABSTRACT

Systems and methods for enhancing a user's efficiency while operating an oral hygiene device (10) is provided. In an exemplary embodiment, motion information of an oral hygiene device is received from one or more accelerometers (32) located within the oral hygiene device. The received motion information is compared to a targeted motion of the oral hygiene device. The user operating the oral hygiene device is then provided with feedback in response to determining that the received motion information is within a predefined range of the targeted motion information.

4 Claims, 21 Drawing Sheets

(52) U.S. Cl.
CPC ........ *A46B 15/0038* (2013.01); *A61C 17/221* (2013.01); *A46B 15/0008* (2013.01)

(58) Field of Classification Search
USPC .......................................... 15/105
See application file for complete search history.

(56) References Cited

U.S. PATENT DOCUMENTS

| | | | |
|---|---|---|---|
| 2009/0092955 A1* | 4/2009 | Hwang | A46B 15/0002 |
| | | | 434/263 |
| 2009/0241278 A1 | 10/2009 | Lemchen | |
| 2009/0320227 A1 | 12/2009 | Cohen | |
| 2013/0000670 A1 | 1/2013 | Binner | |
| 2013/0074616 A1 | 3/2013 | Puurunen | |
| 2014/0065588 A1 | 3/2014 | Jacobson | |
| 2014/0259472 A1 | 9/2014 | Bovenkamp | |
| 2015/0044629 A1* | 2/2015 | Wang | A46B 15/0006 |
| | | | 433/27 |

FOREIGN PATENT DOCUMENTS

| | | |
|---|---|---|
| WO | WO2014202250 A1 | 12/2014 |
| WO | WO2015059443 A1 | 4/2015 |

\* cited by examiner

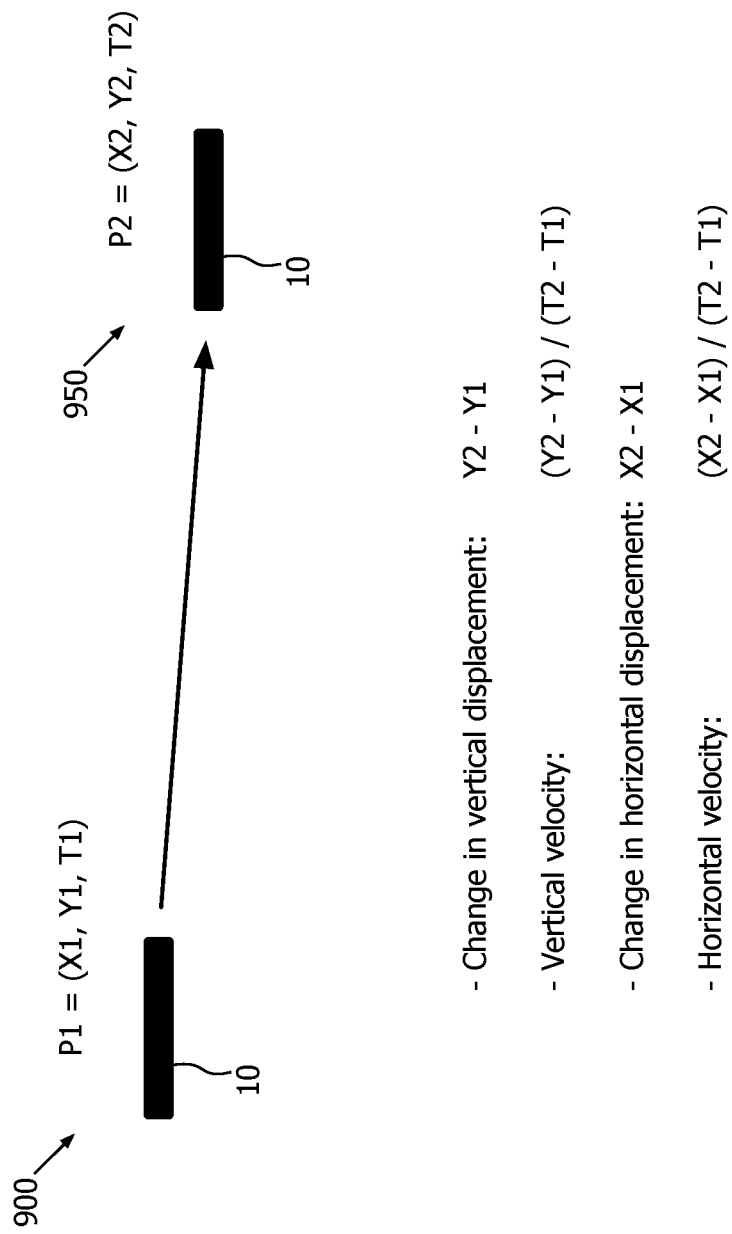

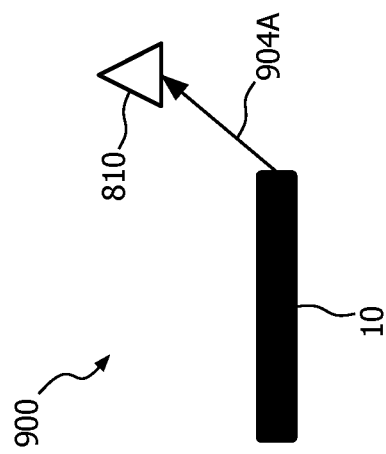
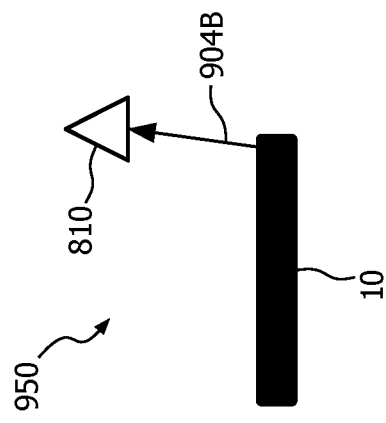
FIG. 11
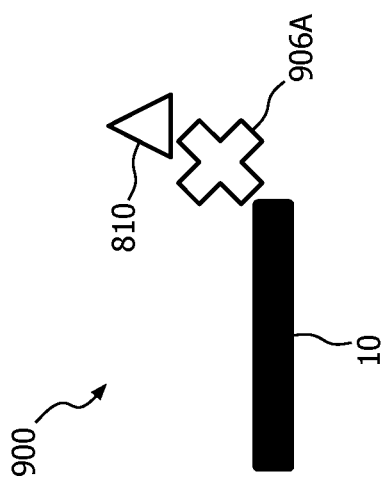
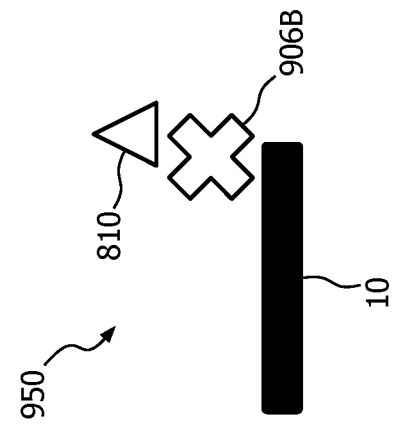
FIG. 12

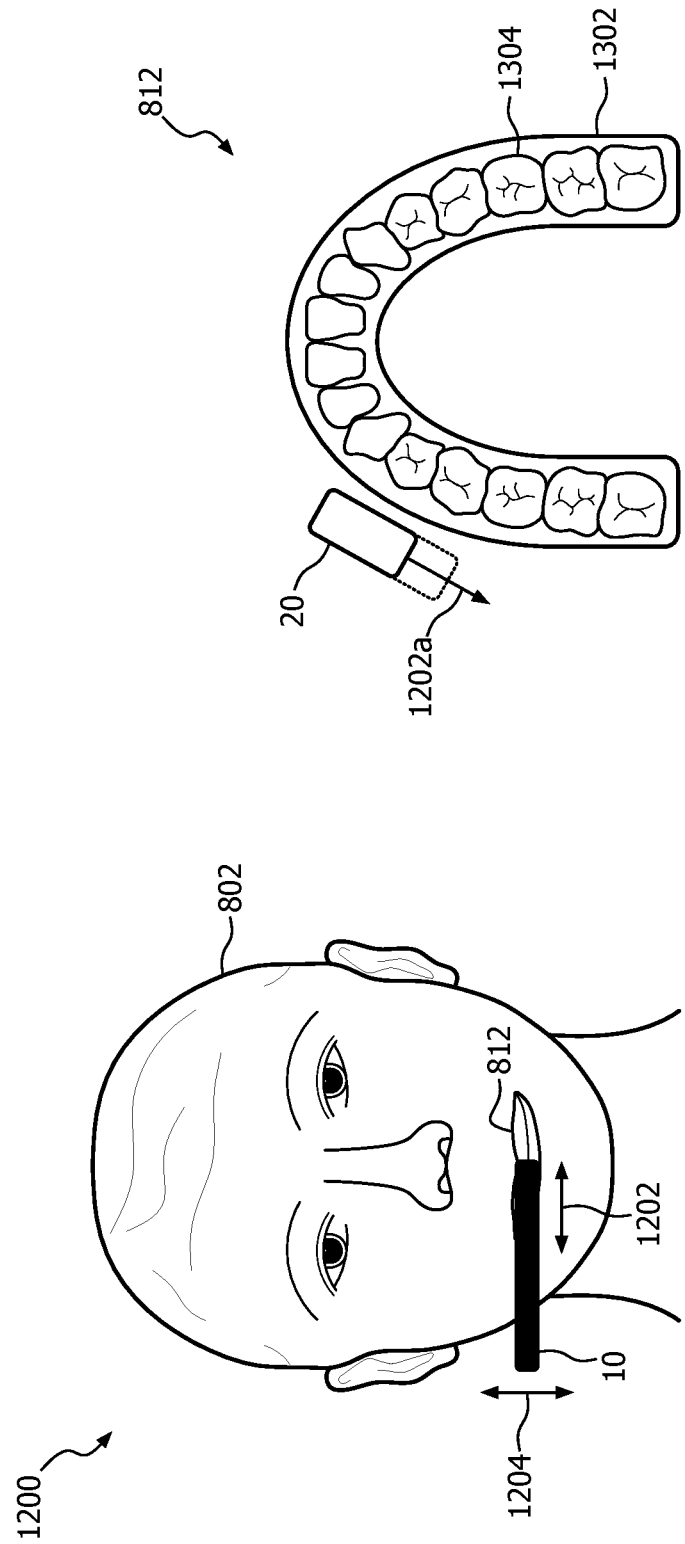

METHODS AND SYSTEMS FOR EXTRACTING BRUSHING MOTION CHARACTERISTICS OF A USER USING AN ORAL HYGIENE DEVICE INCLUDING AT LEAST ONE ACCELEROMETER TO PROVIDE FEEDBACK TO A USER

CROSS-REFERENCE TO PRIOR APPLICATIONS

This application is the U.S. National Phase application under 35 U.S.C. § 371 of International Application No. PCT/IB2016/053842, filed on Jun. 28, 2016, which claims the benefit of U.S. Provisional Patent Application No. 62/185,926, filed on Jun. 29, 2015. These applications are hereby incorporated by reference herein.

BACKGROUND OF THE INVENTION

1. Field of the Invention

The present disclosure generally relates to oral hygiene devices and, in particular, oral hygiene devices including at least one accelerometer operable to determine a quality of a brushing motion of the oral hygiene device and providing feedback to the user based on the extracted characteristics. The present disclosure also generally relates to systems and methods using an oral hygiene device including at least one accelerometer to determine a quality of a brushing motion of the oral hygiene device.

2. Description of the Related Art

While correct oral hygiene is important, correcting one's oral hygiene technique is oftentimes difficult. One solution to this problem is for an individual to demonstrate their oral hygiene technique while in the presence of an oral hygiene professional, such as a dentist, and have the oral hygiene professional correct any mistakes performed by the individual. This, however, has inherent flaws because the individual may not remember all of the corrected aspects, as well as the fact that the user may not perform their true oral hygiene technique while in the presence of the oral hygiene professional. Furthermore, over time, the individual's oral hygiene technique may regress to the previous incorrect manner and/or a new incorrect style, or the individual may develop new, incorrect techniques.

One proposed solution to such a problem is to create a "game" where performing correct oral hygiene technique is rewarded by an individual winning the game, whereas incorrect oral hygiene techniques leads to one losing the game. Although this concept may work for children, it is often impractical and ineffective for adults. Furthermore, playing the game may only help one correct their oral hygiene technique while the game is being played, and the individual is not able to see how their overall oral hygiene technique is improving, or when they are deviating too far from a correct technique. Still further, such oral hygiene games are not typically transportable and therefore not capable of providing an individual with real-time feedback regarding the efficacy of their oral hygiene care.

SUMMARY OF THE INVENTION

Accordingly, it is an objective of this disclosure to provide an oral hygiene device, such as an electronic toothbrush, that is capable of extracting motion characteristic of a user operating the oral hygiene device and providing feedback to the user regarding the efficacy of their technique. This objective is achieved according to the present disclosure by analyzing motion characteristics of the oral hygiene device and, based on data acquired from at least one sensor included within the oral hygiene device or at least one image capturing component, provide feedback to the user informing them of the efficacy of their operation of the oral hygiene device. Furthermore, it is another object of this invention to provide a user device capable of detecting motion characteristics of a user operating an oral hygiene device. The user device is further operable to extract motion characteristics of the user operating the oral hygiene device, and provide feedback to the user.

In a first exemplary embodiment, a method for providing feedback to a user operating an oral hygiene device including at least one sensor is provided. In one embodiment, data acquired by the at least one sensor of the oral hygiene device is received. The acquired data is then analyzed to determine a quality of motion of the oral hygiene device operated by the user. Feedback is then provided to the user based on the determine quality of motion.

In a second exemplary embodiment, an oral hygiene device is provided. The oral hygiene device, in one embodiment, includes a handle including a power drive system, an attachment assembly, a drive train assembly coupled to the attachment assembly, a magnet operable to produce a magnetic field, at least one sensor mounted within the magnetic field produced by the magnet, and at least one processor. The at least one processor is operable to acquire data from the at least one sensor. The data corresponds to deformations of the magnetic field relative to the at least one sensor, the deformations occurring in response to the attachment assembly having an external force applied thereto while interacting with a region of interest of a user that is operating the oral hygiene device.

In a third exemplary embodiment, a method for enhancing a user's efficacy while operating an oral hygiene device is provided. In one embodiment, at least one image is captured from an image capturing component. A region of interest for operating the oral hygiene device is then determined based on the at least one captured image. Based on the determined region of interest, characteristics corresponding to a motion of the oral hygiene device operated by the user are extracted. The extracted characteristics corresponding to the motion of the oral hygiene device operated by the user are then analyzed to determine a quality of motion of the oral hygiene device. Feedback is then provided to the user regarding the determined quality of motion of the oral hygiene device.

In a fourth exemplary embodiment, a user device for aiding a user in enhancing an effectiveness for operating an oral hygiene device is provided. The user device includes at least one image capturing component, a display screen, communications circuitry, memory, and at least one processor. The at least one processor is operable to capture at least two images of the user operating the oral hygiene device using the at least one image capturing component. In response to detecting that the user is operating the oral hygiene device in a region of interest, motion information of the oral hygiene device is extracted from the at least two captured images. The extracted motion information of the oral hygiene device operated by the user is then analyzed by comparing the extracted motion information to a predefined targeted motion for the oral hygiene device stored in memory on the user device. The comparison determines a quality of the extracted motion of the oral hygiene device. Feedback is then provided to the user operating the oral hygiene device, where the provided feedback includes the quality of the extracted motion information.

In a fifth exemplary embodiment, a method for determining if a user is using an oral hygiene device correctly is provided. In some embodiments, motion information of an oral hygiene device is received from at least one accelerometer located within the oral hygiene device. The received motion information is then compared to a targeted motion of the oral hygiene device. If it is determined that the received motion information is within a predefined threshold range of the targeted motion of the oral hygiene device, feedback is provided to a user operating the oral hygiene device. For example, provided feedback may correspond to haptic feedback and/or visual feedback.

In a sixth exemplary embodiment, an oral hygiene device operable to determine a quality of brushing by a user is provided. The oral hygiene device includes a handle portion including a power drive system, an attachment assembly, memory located within the handle portion, at least one accelerometer located within the handle portion, and at least one processor. The at least one processor is operable to obtain information from the at least one accelerometer corresponding to a brushing motion of the oral hygiene device. The obtained information corresponding to the brushing motion of the oral hygiene device is then compared to a targeted brushing motion for the oral hygiene device that is stored within the memory. A difference between the brushing motion of the oral hygiene device and the targeted brushing motion for the oral hygiene device is then calculated, and a score for the brushing motion of the oral hygiene device is generated based on the calculated difference.

In a seventh exemplary embodiment, a user device for providing information to a user operating an oral hygiene device regarding a quality of the user's brushing motion is provided. The user device includes a display screen, communications circuitry, memory, and at least one processor. The at least one processor is operable to receive information obtained by at least one accelerometer located on the oral hygiene device. The received information corresponds to at least one of a frequency, an amplitude, and an energy of a brushing motion of the oral hygiene device, in some embodiments. It is then determined if at least one of the frequency, amplitude, and energy of the brushing motion of the oral hygiene device is one of greater than and equal to a predefined threshold value for a targeted brushing motion of the oral hygiene device. If at least one of the frequency, amplitude, and energy of the brushing motion is one of greater than and equal to the predefined threshold value for the targeted brushing motion of the oral hygiene device, one or more of at least one of the frequency, amplitude, and energy of the brushing motion of the oral hygiene device, and a difference between at least one of the frequency, amplitude, and energy of the brushing motion of the oral hygiene device and the predefined threshold value for the targeted brushing motion of the oral hygiene device is displayed on the display screen.

BRIEF DESCRIPTION OF THE DRAWINGS

The above and other features of the present invention, its nature and various advantages will be more apparent upon consideration of the following detailed description, taken in conjunction with the accompanying drawings in which:

FIG. 10 is an illustrative diagram describing a change in a location of device 10 based on a change in pixel position and frame in accordance with various embodiments;

FIG. 11 is an illustrative diagram describing a change in a location of device 10 based on a change in a position vector between device 10 and a reference object in accordance with various embodiments;

FIG. 12 is an illustrative diagram describing a change in a location of device 10 based on a change in a center of gravity of a captured image in accordance with various embodiments;

FIG. 15 is an illustrative diagram of user device 10 being used in accordance with various embodiments;

FIGS. 16A-E are illustrative diagrams of attachment assembly 20 of an oral hygiene device being used to brush one or more teeth 1304 in accordance with various embodiments;

DETAILED DESCRIPTION OF EXEMPLARY EMBODIMENTS

The present invention may take form in various components and arrangements of components, and in various techniques, methods, or procedures and arrangements of steps. The referenced drawings are only for the purpose of illustrated embodiments, and are not to be construed as limiting the present invention. Various inventive features are described below that can each be used independently of one another or in combination with other features. Furthermore, as used herein, the singular form of "a", "an", and "the" include plural references unless the context clearly dictates otherwise.

Figure 1A:
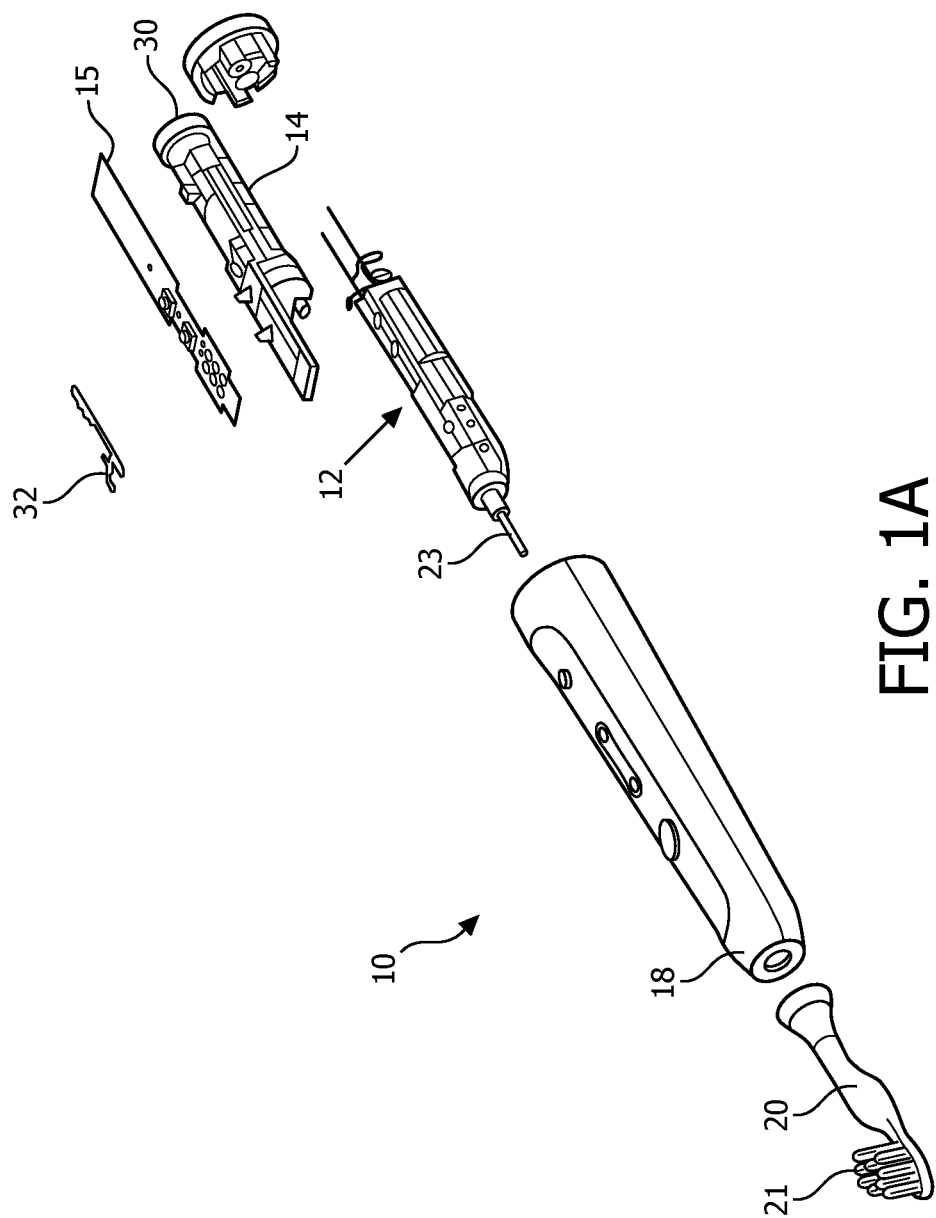
FIG. 1A is an illustrative diagram of an oral hygiene device 10 including at least one sensor in accordance with various embodiments.

FIG. 1A is an illustrative diagram of oral hygiene device 10 including at least one sensor in accordance with various embodiments. Oral hygiene device 10 includes a housing 18 containing a drive train assembly 12 resonantly driven by a power system 14 which includes a battery and an electronics carrier (e.g., a printed circuit board or PCB). Oral hygiene device 10 further includes a printed circuit board with a microprocessor control 15 for creating a drive signal for power system 14. Removably secured to a drive stem 23 from the drive train assembly 12 is an attachment assembly 20, at the distal end of which is a brush member 21. At a rear end of drive train assembly 12 is a magnet 30, and mounted within oral hygiene device 10 is also at least one sensor 32. In one exemplary embodiment, at least one sensor 32 is a Hall Effect sensor. A more detailed description of an oral hygiene device including at least one Hall Effect sensor can be found in commonly assigned International Patent Application Publication No. WO 2014/037856, which is incorporated herein by reference in its entirety.

In one embodiment, sensor(s) 32 is a Hall Effect sensor capable of measuring a strength of a magnetic field within housing 18. A magnetic field is capable of being generated by a magnet 30. Application of a Hall Effect sensor in the exemplary embodiment, measures the magnetic field strength relative to the Hall Effect sensor. When an external load, or force, is applied to attachment assembly 20, a deformation of the magnetic field within housing 18 occurs. This deformation is measured via sensor(s) 32, and may provide information regarding an amount of force applied to attachment assembly 20.

In one embodiment, at least one sensor 32 is a force sensor. The force sensor may be included in place of the Hall Effect sensor and/or in conjunction with the Hall Effect sensor. The force sensor allows for information to be extracted from oral hygiene device 10 corresponding to an amount of force applied to attachment assembly 20. In one embodiment, however, the amount of force applied to attachment assembly 20 may also be extracted from a Hall Effect sensor. For example, the force applied to attachment assembly 20 may be obtained, in one embodiment, using the Lorentz Force law.

In one embodiment, sensor(s) 32 may also include one or more accelerometers capable of determining how quickly (e.g., a velocity and/or acceleration) oral hygiene device 10 is moving. In one embodiment, the accelerometers are operable to measure changes in the motion of oral hygiene device 10 by determining a change in an orientation of oral hygiene device 10 with respect to gravity (see below).

In one embodiment, an additional pre-processing step is performed to remove any effects of gravity from the accelerometer's signal. For example, the accelerometer's signal may have added noise due to gravitational effects detected by the accelerometer. By applying pre-processing, such as a low or high-pass filter, the noise may be removed such that accurate analysis of the accelerometer's motion may occur.

Figure 1B:
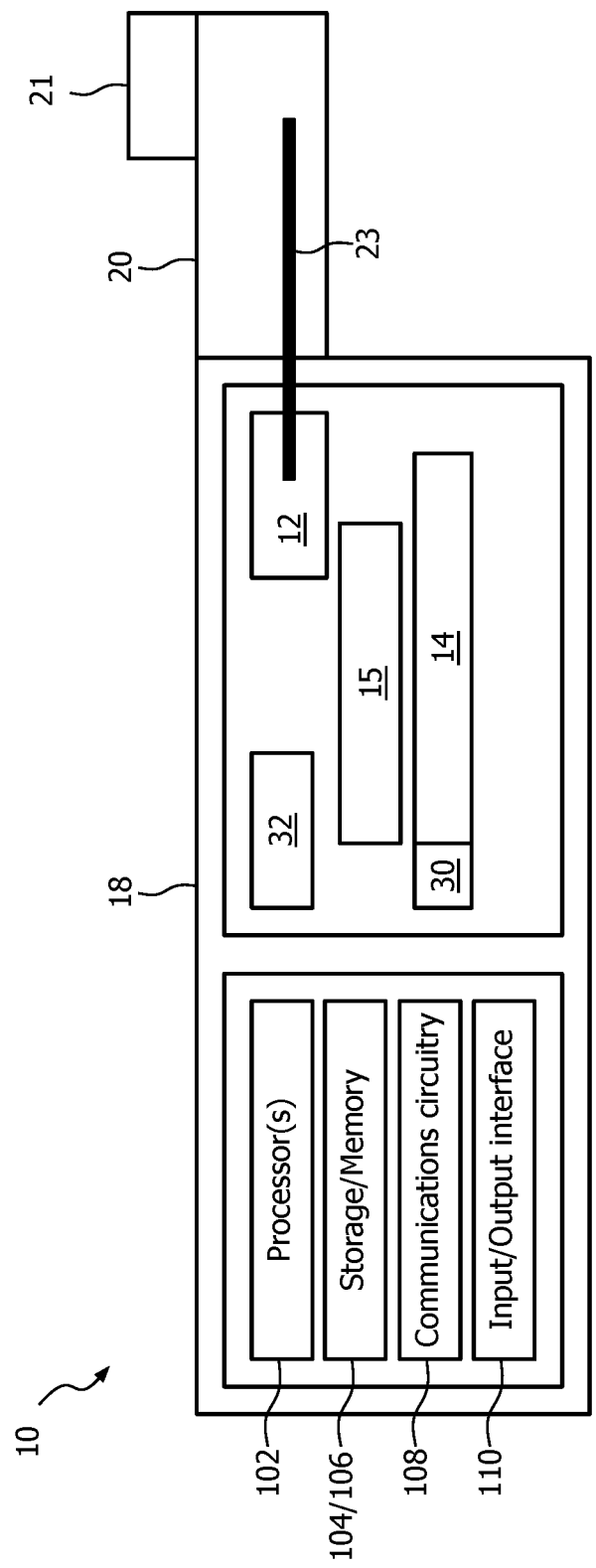
FIG. 1B is an illustrative diagram of an oral hygiene device 10 in accordance with various embodiments.

FIG. 1B is an illustrative diagram of oral hygiene device 10 in accordance with various embodiments. In the illustrated exemplary embodiment oral hygiene device 10 also includes additional components located within housing 18.

Oral hygiene device 10, in the illustrated non-limiting embodiment, includes a processor or processors 102, memory 106, communications circuitry 108, and an input/output interface 110. These components may be located on microprocessor control 15, or may be located elsewhere within the housing 18. Processor 102 may include any processing circuitry, such as one or more processors capable of controlling the operations and functionality of oral hygiene device 10. In one embodiments, processor 102 facilitates communications between various components within device 10 (e.g., sensor(s) 32 and communications circuitry 108).

Memory 106, in one embodiment, includes one or more storage mediums. Various types of storage mediums include, but are not limited to, hard-drives, solid state drives, flash memory, permanent memory (e.g., ROM), or any other storage type, or any combination thereof. Any form of data or content may be stored within memory 106, such as photographs, music files, videos, contact information, applications, documents, or any other file, or any combination thereof. Memory 106 also, in one embodiment, includes cache memory, semi-permanent memory (e.g., RAM), or any other memory type, or any combination thereof. In one embodiments, memory 106 may be used in place of and/or in addition to external storage for storing data on oral hygiene device 10.

Communications circuitry 108, in one embodiment, includes any circuitry capable of connecting to a communications network and/or transmitting communications (voice and/or data) to one or more additional user devices and/or servers. Communications circuitry 108 is capable of interfacing with the communications network using any suitable communications protocol including, but not limited to, Wi-Fi (e.g., 802.11 protocol), Bluetooth®, radio frequency systems (e.g., 900 MHz, 1.4 GHz, and 5.6 GHz communications systems), infrared, GSM, GSM plus EDGE, CDMA, quadband, VOIP, or any other protocol, or any combination thereof.

Input/output interface 110, in one embodiment, includes any suitable mechanism or component for receiving inputs from a user operating oral hygiene device 10 and/or generating outputs from a user operating oral hygiene device 10. Input/output interface 110 may include, but is not limited to, an external keyboard, mouse, joystick, or any other suitable input mechanism, or any combination thereof. In one embodiment, input/output interface 110 includes a display capable of displaying a user interface thereon.

Oral hygiene device 10 is operable to acquire data from sensor 32 or any other sensor resident therein, and analyze the data to determine a quality of a brushing motion of the user operating oral hygiene device 10. For example, sensor(s) 32 may be a Hall Effect sensor or a Force sensor or both. In one particular example, a Hall Effect sensor may be used to extract force information. As another example, sensor(s) 32 may include one or more accelerometers. In one embodiment, the analyzed data is used to provide feedback to the user via input/output interface 110. For example, input/output interface 110 may include a display screen operable display a user interface including analysis of the user's quality of brushing. As another example, input/output interface 110 may provide an audio, visual, or haptic feedback to the user based on the analyzed data acquired by the at least one sensor 32. Persons of ordinary skill in the art will also recognize that although at least one sensor 32 is used to acquire data, one or more additional sensors may be used.

Figure 1C:
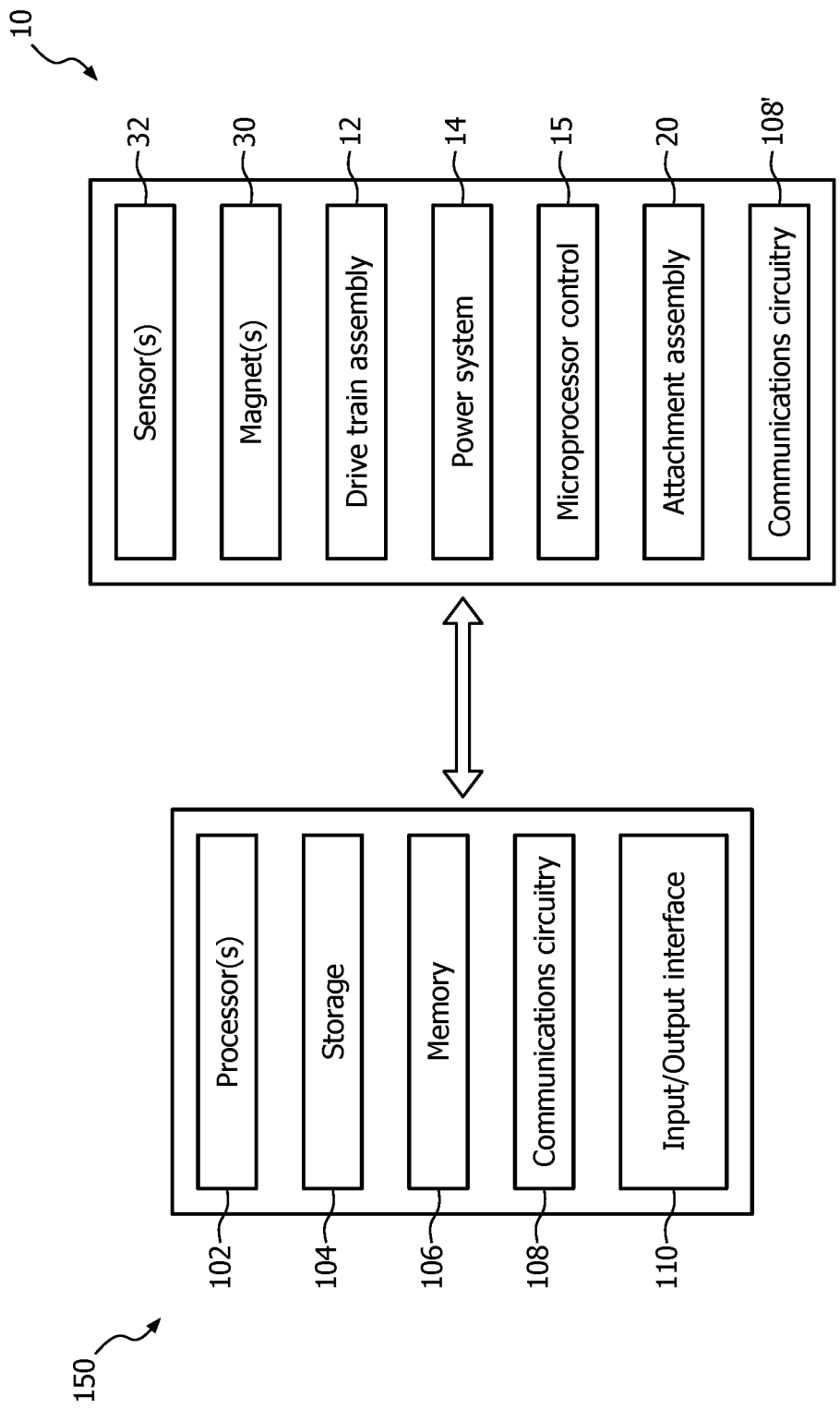
FIG. 1C is an illustrative diagram of oral hygiene device 10 and a user device 150 in accordance with various embodiments.

FIG. 1C is an illustrative diagram of oral hygiene device 10 and user device 150 in accordance with various embodiments. In the illustrated exemplary embodiment, user device 150 includes one or more processors 102, storage 104, memory 106, communications circuitry 108, and input/output interface 110. Oral hygiene device 10, in the illustrated exemplary embodiment, is substantially similar to oral hygiene device 10 of FIG. 1A with the exception that it also include communications circuitry 108, which is substantially similar to communications circuitry 108 of user device 150.

Communications circuitry 108, in one embodiment, enables data acquired by sensor(s) 32 to be transmitted from oral hygiene device 10 to user device 150 via communications circuitry 108. For example, data from sensor(s) 32 (e.g., a Hall Effect sensor) of oral hygiene device 10 may be transmitted to user device 150 via a Wi-Fi connection, a Bluetooth connection, and/or a hardwire connection.

Data acquired by sensor(s) 32 of oral hygiene device 10 corresponds to detected deformations of a magnetic field formed within housing 18 of oral hygiene device 10 based on a user operating oral hygiene device 10. For example, when an external force or load is applied to attachment assembly 21, a deformation may occur to the magnetic field within housing 18 that is measurable by sensor(s) 32. The data is capable of being sent from oral hygiene device 10 to user device 150 for processing, analysis, and/or providing feedback to the user operating oral hygiene device 10. For example, data acquired by sensor(s) 32, such as a Hall Effect sensor, may be analyzed on user device 150 using one or more algorithms stored within memory 106, which determine a quality of the brushing of the user. Feedback is then capable of being provided to the user regarding the determined quality of their brushing motion. In one embodiment, the feedback is displayed on a display screen presenting a user interface.

Persons of ordinary skill in the art will recognize that oral hygiene device 10 may refer to any product able to attend to an individual's oral hygiene, including, but not limited to, electric toothbrushes, non-electric toothbrushes, floss devices, water jets, tongue cleaners, or any other oral hygiene device, or any combination thereof. Furthermore, in at least one embodiment, oral hygiene device 10 may refer to a personal hygiene device, such as an electronic shaver, hair trimmer, personal groomer, etc., and the foregoing illustrations are not limited to just oral hygiene scenarios.

Figure 2:
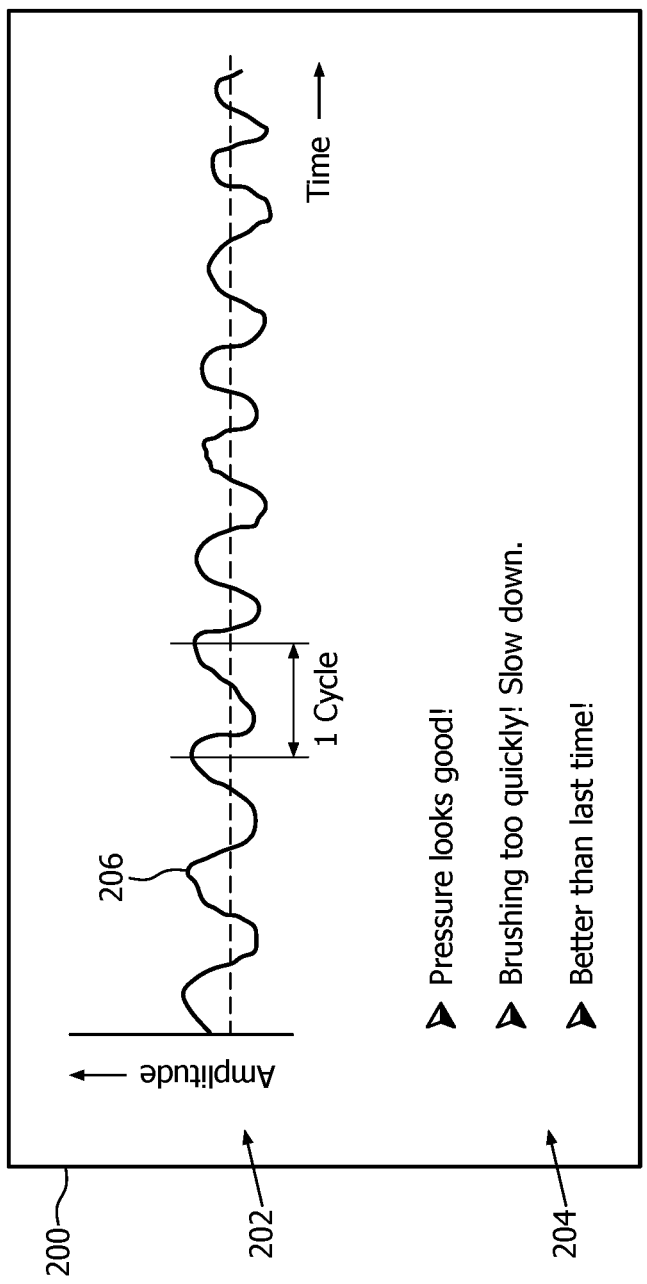
FIG. 2 is an illustrative diagram of a user interface 200 in accordance with various embodiment.

FIG. 2 is an illustrative diagram of a user interface 200 in accordance with various embodiments. User interface 200, in one embodiment, is displayed on a user device including a display screen (e.g., input/output interface 110 of user device 150). For example, user interface 200 may be displayed on a touch-sensitive display screen found on a handheld device such as a smart phone or tablet. As another example, user interface 200 may be displayed on a display screen of an electric toothbrush (e.g., input/output interface 110 of oral hygiene device 10 as shown in FIG. 1B.

User interface 200, in the illustrated embodiment, includes information corresponding to the activity of a user operating oral hygiene device 10 including one or more sensor(s) 32

In the illustrated embodiment, user interface 200 includes a graph section 202 and a comments section 204. Graph section 202 displays a graphical representation 206 of data obtained from sensor(s) 32 of oral hygiene device 10, and in particular, an amplitude of a brushing motion of oral hygiene device 10 over a period of time that oral hygiene device 10 is in operation. Graph section 202 allows a user operating oral hygiene device 10 to visually see how their brushing technique applies pressure to their teeth over time, and allows a user to correct various inconsistencies that may arise in their technique. For example, if graphical representation 206 has an amplitude that is continually high, low, or generally inconsistent, the user will be able to visually see that information represented within graph section 202 via graphical representation 206. Furthermore, graphical representation 206 enables a user to visualize the frequency of their brushing motion and determine if their brushing technique is too fast or too slow.

Comments section 204, in the illustrative embodiment, includes comments generated by user device 150 displaying on user interface 200 that correspond to the user's brushing technique. For example, if the user is applying a correct amount of pressure to their teeth, a message stating "PRESSURE LOOKS GOOD!" may be displayed on user interface 200, whereas if the user is not applying enough pressure, a message stating "PRESSURE IS TOO LOW" may be displayed on user interface 200. Other comments related to the frequency of the user's brushing and/or the quality of the user's brushing compared to a previous brushing session are also able to be displayed within comments section 204.

In one embodiment, one or more algorithms resident on user device 150 and/or oral hygiene device 10 obtain data from sensor(s) 32 (e.g., a Hall Effect sensor) and convert that data into a numerical representation. The numerical representation may then be compared to a predefined value for brushing pressure, frequency, and/or quality, which are operable to cause one or more different messages to appear in comments section 204. For example, a look-up table may be included in memory 106 on user device 150 and/or oral hygiene device 10 that informs user device 150 and/or oral hygiene device 10 to display the message "PRESSURE LOOKS GOOD!" when the obtained data from sensor(s) 32 indicates that a correct amount of pressure is being applied by the user operating oral hygiene device 10.

Figure 3B:
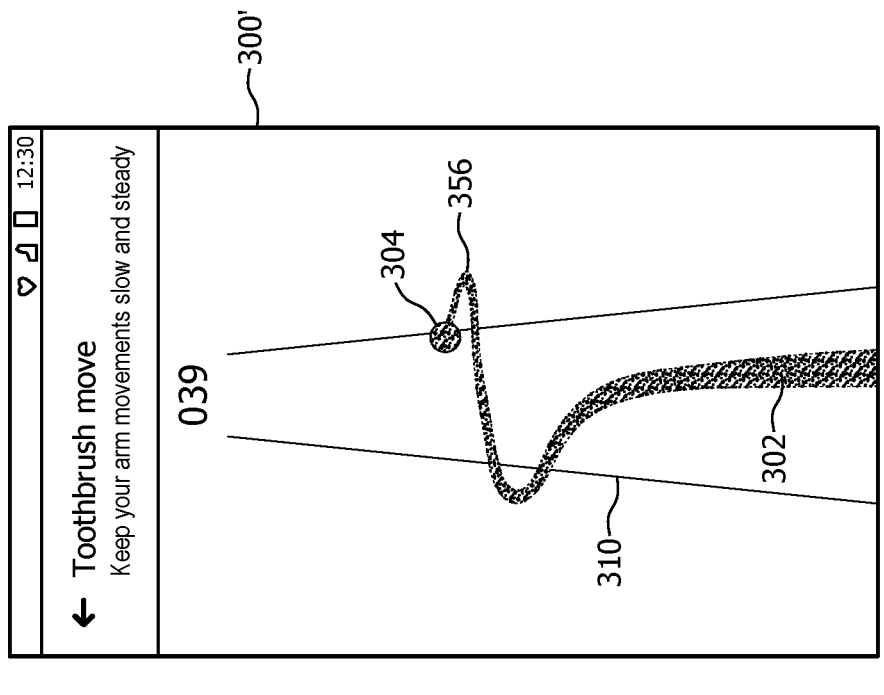
FIGS. 3A and 3B are illustrative diagrams of user interfaces 300 and 300', respectively, in accordance with various embodiments.
Figure 3A:
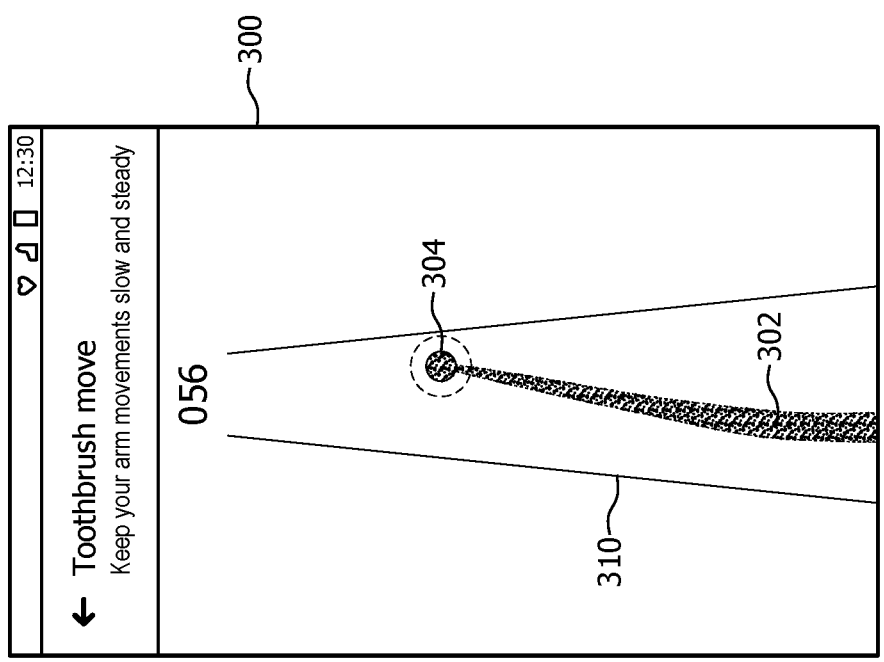

FIGS. 3A and 3B are illustrative diagrams of other user interfaces 300 and 300', respectively, in accordance with various embodiments. In the illustrative embodiments, user interface 300 displays graphics that inform a user when their brushing motion is below a targeted brushing motion, whereas user interface 300' displays graphics that inform a user when their brushing motion is greater than the targeted brushing motion. User interfaces 300 and 300' are capable of being displayed on a display screen of a user device that receives data obtained by sensor(s) 32 of oral hygiene device 10 and/or a display screen located on oral hygiene device 10 and/or user device 150.

In one embodiment, the targeted brushing motion is stored in memory 106 on user device 150 and/or oral hygiene device 10, which display user interface 300. The targeted brushing motion may be defined prior to any brushing activity occurring. For example, the targeted brushing motion may be defined by the user, the user's parents, and/or the user's dental professional. As the user brushes their teeth, sensor(s) 32 of oral hygiene device 10 acquires data related to an external force applied to oral hygiene device 10. For example, if sensor(s) 32 is a Hall Effect sensor, the external force applied will cause an internal deformation of the magnetic field within housing 18 of oral hygiene device 10 and the internal deformation is measured relative to sensor(s) 32 (e.g., a Hall Effect sensor) of oral hygiene device 10. The Hall Effect sensor, in one embodiment, is set to have a data acquisition rate at least twice of an expected maximum motion frequency, however persons of ordinary skill in the art will recognize that any suitable acquisition rate may be used and the aforementioned is merely exemplary.

User interface 300 includes a target brushing motion window 310 that indicates bounds of the targeted brushing motion for the user operating oral hygiene device 10. The user's current brushing motion is indicated, in one embodiment, by a marker 304. As the brushing motion changes over time, a path 302 is displayed that indicates the various positions of marker 304 during brushing. In one embodiment, 300, marker 304 and path 302 indicate that the user's brushing motion is lower than the targeted brushing motion defined by target brushing motion window 310. The user may be capable of visually seeing user interface 300 presented on a display screen (e.g., input/output interface 110) and appropriately correcting their brushing technique. For example, marker 304 and path 302 of user interface 300 may indicate that the brushing motion of the user is lower than the targeted brushing motion, and therefore the user may increase their brushing motion (e.g., frequency and/or amplitude).

In user interface 300', the brushing motion of the user is greater than the target brushing motion. As seen in FIG. 3B, path 302 shows that the user, at a point 356, has exceeded the target brushing motion defined by target brushing motion window 310. In this particular scenario, the user is able to view user interface 300' and correct their brushing by decreasing their frequency and/or amplitude of brushing to return to the target brushing motion.

Figure 4:
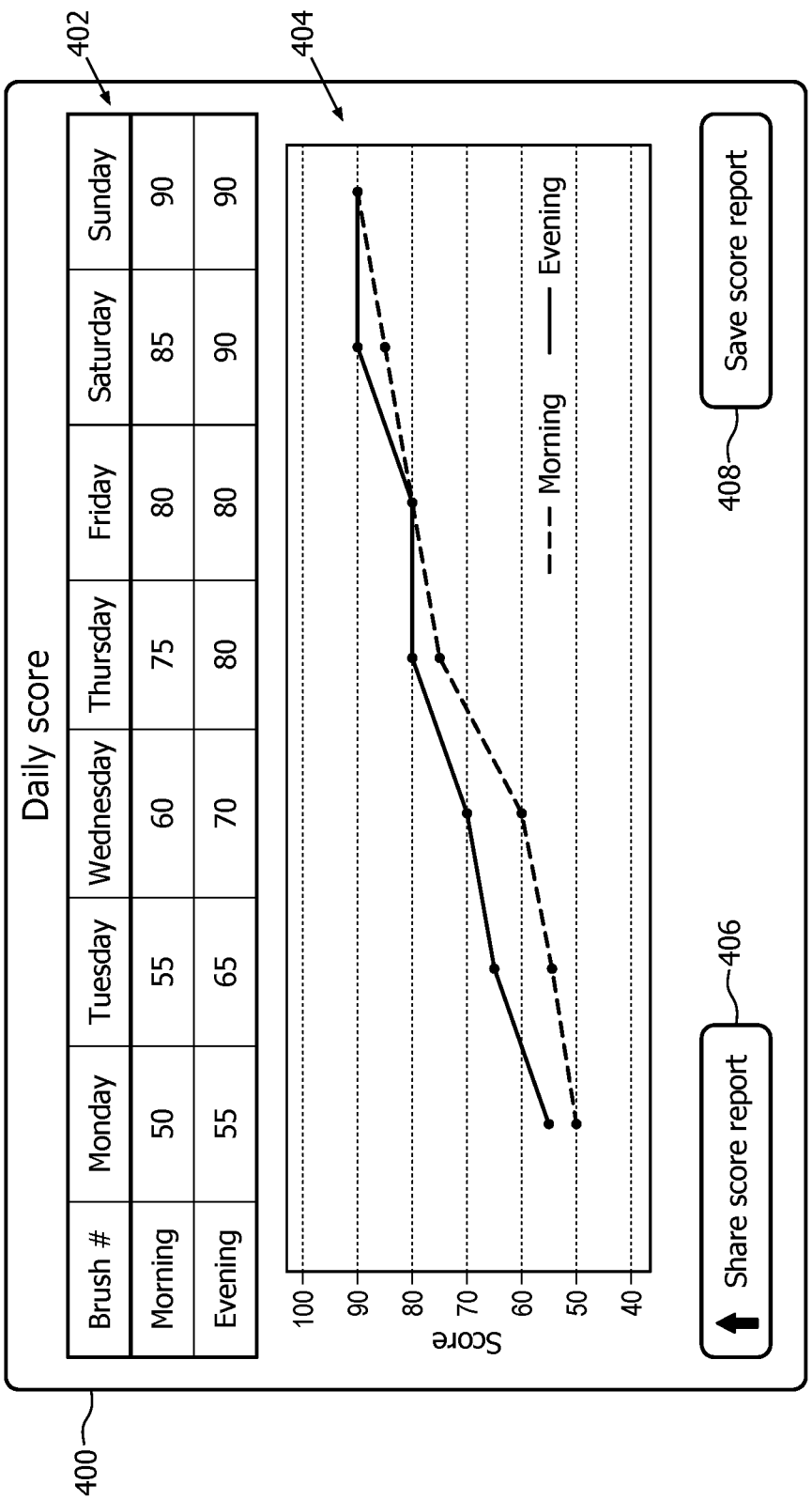
FIG. 4 is an illustrative diagram of a user interface 400 in accordance with various embodiments.

FIG. 4 is an illustrative diagram of another user interface 400 in accordance with various embodiments. User interface 400, in one embodiment, is displayed on a display screen (e.g., input/output interface 110). In one embodiment, user interface 400 includes a scoring information chart 402 that details a user's brushing score each time the user brushes their teeth. For example, a score may be given to each brushing session, where the higher the score, the better the brushing session, and the lower the score, the worse the brushing session.

In one exemplary embodiment, scoring information chart 402 includes a morning score and an evening score for each day of one week. Persons of ordinary skill in the art will recognize that although only seven (7) days and two sessions per day are displayed, any number of days and any number of sessions may be included within scoring information chart 402. A scoring information graph 404 is displayed within user interface 400, in one embodiment, that tracks the user's brushing score graphically so that the user visualizes whether or not their brushing technique is improving from day to day. This may be especially useful for parents to use with their children to ensure that they are continually brushing their teeth and that they are learning proper oral hygiene care and not repeating the same incorrect brushing techniques.

User interface 400 also includes, in the illustrative embodiment, a share score report button 406 and a save score report button 408. Share score report button 406 allows data included within scoring information chart 402 and/or scoring information graph 404 to be shared with one or more contacts, social media websites, and/or user devices. For example, a user particularly proud of their score for a certain week may share their scoring information with their family member or friends. As another example, a user may share their scoring information with their dental professional to inform them of their diligent care.

Save score report button 408, in one embodiment, allows a user to store their score(s) on their user device 150. For example, a user may store each score from week to week on their user device so that a robust data set may be produced to review with their dental professional at their next appointment. The saved scoring information may be stored in a memory on a user device 150 and/or on a cloud storage system with which the user has an account on or which may be accessed by other individuals (e.g., parents, dental professionals, etc.).

Figure 5:
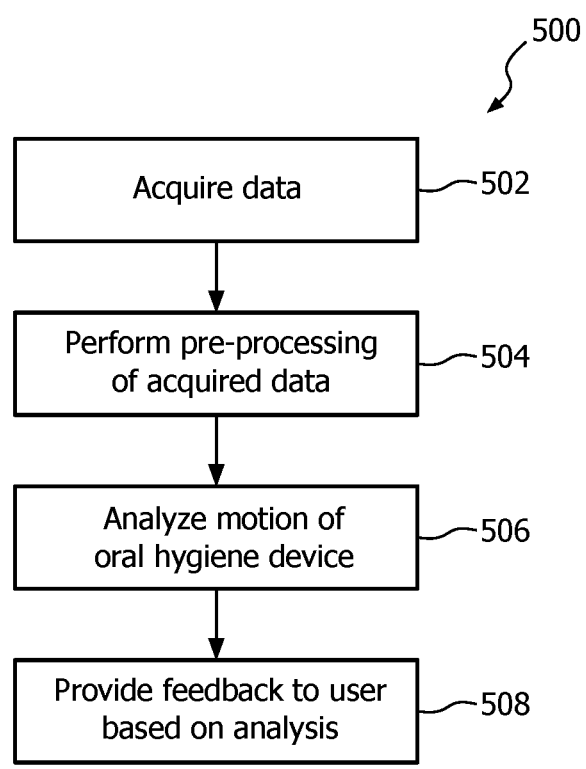
FIG. 5 is an illustrative flowchart of a process 500, in accordance with various embodiments.

FIG. 5A is an illustrative flowchart of process 500 for providing feedback to a user operating oral hygiene device 10 in accordance with various embodiments. Process 500 begins at step 502. At step 502, data is acquired, in one embodiment, from sensor(s) 32 of oral hygiene device 10. For example, data may be acquired from a Hall Effect sensor located on oral hygiene device 10. In another embodiment, data is acquired from one or more additional sensors located on oral hygiene device 10, such as a force sensor and/or a combination of a force sensor, a Hall Effect sensor, and/or an accelerometer. In some embodiments, that date may be transmitted to user device 150 via communications circuitry 108 and 108'. Various ways that the data is transferable from oral hygiene device 10 to user device 150 include, but are not limited to, Bluetooth®, Wi-Fi, cellular data, and/or a wired connection.

In one embodiment, sensor(s) 32 is set to have an acquisition rate at least twice an expected maximum motion frequency. The motion frequency typically ranges between 0.1 Hz and 8 Hz. If the motion frequency is 0.1 Hz, then the acquisition rate should be at least 0.2 Hz, whereas if the motion frequency is 8 Hz, then the acquisition rate should be at least 16 Hz, for example. In one particular embodiment, the acquisition rate is set to be approximately 30 Hz. However, persons of ordinary skill in the art will recognize that any acquisition rate may be set for any maximum motion frequency, and the aforementioned is merely exemplary.

At step 504, pre-processing of the acquired data is performed by one or more algorithms stored in memory 106 by processor(s) 102 of oral hygiene device 10 and/or user device 150. Pre-processing the acquired data allows, in one embodiment, the data to be modified so that it can be more readily analyzed. In one embodiment, pre-processing of the acquired data corresponds to downscaling or subsampling the acquired data. In another embodiment, data reduction is performed on the acquired data to emphasize the brushing motion information. For example, Empirical Mode Decomposition ("EMD") may be performed on the acquired data to turn raw brushing motion signals to create a collection of Intrinsic Mode Function ("IMF") data, which highlights the extrema and/or zero-crossings of the brushing force information. In yet another embodiment, pre-processing of the acquired data corresponds to application of a band-pass filter to remove noise/irrelevant frequency information. For example, a 4 Hz low-pass filter may be applied that removes all frequency information exceed 4 Hz. In one embodiment, the frequency and amplitude relationship may be changed using time integration and/or differentiation. Persons of ordinary skill in the art will recognize that, in one embodiment, pre-processing of the acquired data may not be required because the data, as initially acquired, may already be in a suitable format.

At step 506, the brushing motion of oral hygiene device 10 is analyzed based on the pre-processed acquired data. In one embodiment, the analysis is performed by processor 102 of oral hygiene device 100 and is based on one or more algorithms stored in memory 106 of oral hygiene device 10. In another embodiment, the analysis is performed by processor 102 of user device 150, and is based on one or more algorithms stored in memory 106 of user device 150. User device 150, for example, may correspond to a smartphone or tablet, and therefore may include greater processing capabilities than oral hygiene device 10. The one or more algorithms are operable to decompose the acquired data's analyzable features, such as, for example, brushing motion frequency and/or brushing motion amplitude.

The brushing motion frequency, in one embodiment, is extracted using Fourier analysis to detect a dominant motion frequency using maximum amplitude detection. For example, motion components are windowed using a Hanning window and then sent to a Fast Fourier Transform ("FFT"), to extract dominant frequencies by an index of the maximal frequency amplitude. As another example, a Hilbert transformation may be used for substantially instantaneous frequency estimation.

In another exemplary embodiment, the brushing motion frequency is determined by extracting extrema or a number of zero-crossing in the motion components. Akin to frequency estimation, assuming that a dominant frequency carrier in the obtained signal is in fact the frequency of interest, extraction of the extrema and/or zero-crossings enables the overall system to correlate with expert assessment.

In still another exemplary embodiment, a three band-pass filter is used. The three-band-pass filter is capable of being implemented in software resident on oral hygiene device 10, or user device 150, for example. The three band-pass filter operates to compute an amount of energy as a Root Means Square ("RMS") value in an upper and lower band of the three bands, relative to an amount of energy in a middle band, to indicate a dominant brushing frequency. For example, after the signal is obtained and translated into the frequency domain, an amount of energy in each band of the three bands is determined. If a first, second, and third band go from 0.5-1.5 Hz, 1.5-2.5 Hz, and from 2.5 Hz and higher, respectively, the energy values for each band are extracted, and the band including the dominant amount of energy is determined. Whichever band includes the dominant amount of energy will reveal the region including the dominant frequency.

The brushing motion amplitude, in one embodiment, is obtained by determining a distance between consecutive extrema of the motion signals. For example, the distance between two consecutive extrema may correspond to an amount of time transpiring between two maximum, or minimum, motion signals. The motion signals may change in amplitude over time, therefore the distance between consecutive extrema may be referred to as a temporal distance or a time between consecutive extrema. In another embodiment, the brushing motion amplitude is extracted based on the amplitude of the dominant frequency in the Fourier representation of the obtained signals. As still yet another embodiment, the brushing motion amplitude is obtained by enveloping about the motion components.

In one exemplary embodiment, additional features of the brushing motion are analyzed based on the brushing motion frequency and brushing motion amplitude extracted. Derivatives of the signal may be used to obtain various characteristics of the user's brushing pattern. For example, a first order derivative of the brushing signal will yield velocity readings corresponding to the user's motion. This data is capable of being used to determine how quickly a user is moving oral hygiene device 10 from tooth to tooth, for example. As another example, a second order derivative of the brushing signal will yield acceleration readings corresponding to the user's brushing motion. Integrations of the signals may be used to obtain various characteristics of the user's brushing pattern as well. For example, an acceleration may initially be obtained via sensor(s) 32. The acceleration may be integrated a first time to obtained a velocity of oral hygiene device 10. A second integration may also be performed from the velocity obtained to generate position information for oral hygiene device 10.

At step 508, feedback is provided to a user operating oral hygiene device 10, where the feedback is based, in one embodiment, on the analysis of the user's brushing motion. In one embodiment, the provided feedback corresponds to information displayed by means of a user interface, such as user interfaces 200, 300, 350, and/or 400 on oral hygiene device 10 and/or user device 150. The information displayed therein may inform the user of a quality of their brushing motion. For example, display screens 300 and 350 indicate how well a user is adhering to a predefined brushing motion by informing the user when they are brushing below a target brushing motion or above a target brushing motion. As another example, user interface 200 indicates a user's brushing motion amplitude and/or frequency, as well as informative messages letting the user know how their current brushing motion relates to a predefined target brushing motion.

In one embodiment, audio, visual, and/or haptic feedback is provided to the user based on the analysis of their brushing motion. For example, if the user is applying more pressure than they should be, oral hygiene device 10 and/or user device 150 may provide a vibration, an audio signal (e.g., a beep), and or a visual signal (e.g., a flashing light) informing the user that their brushing motion is incorrect.

In one embodiment, the size of oral hygiene device 10 dictates which type of feedback is provided to the user. For example, if a user device 150 is not used, and oral hygiene device 10 is too small to include a display screen, or oriented such that while brushing, the user is not capable of viewing a display screen, visual feedback may be difficult or ineffective. In this particular scenario, an audio signal or haptic response may be more suitable. However persons of ordinary skill in the art will recognize that any type of feedback may be provided to the user in any suitable manner, and the aforementioned are merely exemplary. For example, a display screen on user device 150 may display user interface 300 or 350, which may indicate to a user operating oral hygiene device 10 that their brushing motion is too low or too high, while at the same time an audio signal may be generated by oral hygiene device 10 to signify the incorrect brushing technique of the user.

Figure 6:
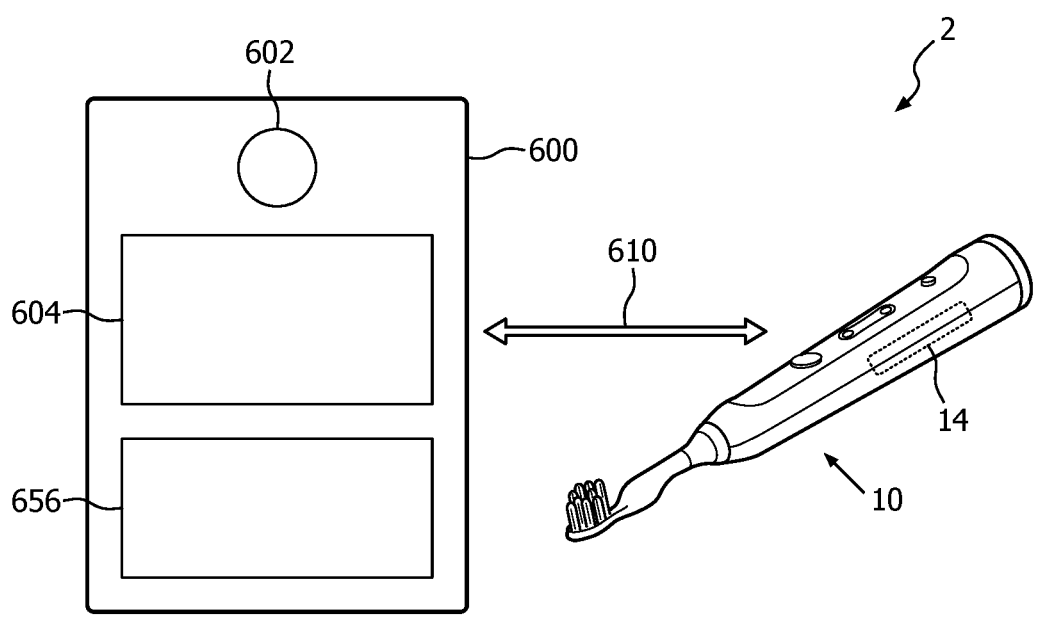
FIG. 6 is an illustrative diagram of a system 2 including a user device 150 and oral hygiene device 10 in accordance with various embodiments.

FIG. 6 is an illustrative diagram of system 2 including a user device 150 and oral hygiene device 10 in accordance with various embodiments. User device 150 of system 2, in one illustrative non-limiting embodiment, includes a camera 602 and a display screen 604. For example, user device 150 may correspond to a user's smart phone or tablet, which may include software resident thereon to analyze a user's brushing motion while they operate oral hygiene device 10. A motion of a user operating oral hygiene device 10, in one embodiment, is capable of being viewed/monitored by camera 602 of user device 150 for analysis, as well as providing feedback to the user operating oral hygiene device 10, which is explained in greater detail below. In one embodiment, user device 150 and oral hygiene device 10 are operable to couple with one another via connection means 610. Connection means 610 includes any wireless or wired connection including, but not limited to, Bluetooth®, Wi-Fi, cellular (e.g., LTE), and/or hardwire connections. In one embodiment, connection means 610 enables feedback to be provided from user device 150 to oral hygiene device 10, or vice versa. In another embodiment, user device 150 further includes one or more additional components such as processing circuitry, feedback circuitry, and/or charging circuitry. In one embodiment, user device 150 includes charging circuitry 656 to that is capable of charging power system 14 of oral hygiene device 10. For example, user device 150 may be a base station compatible with oral hygiene device 10.

Figure 7:
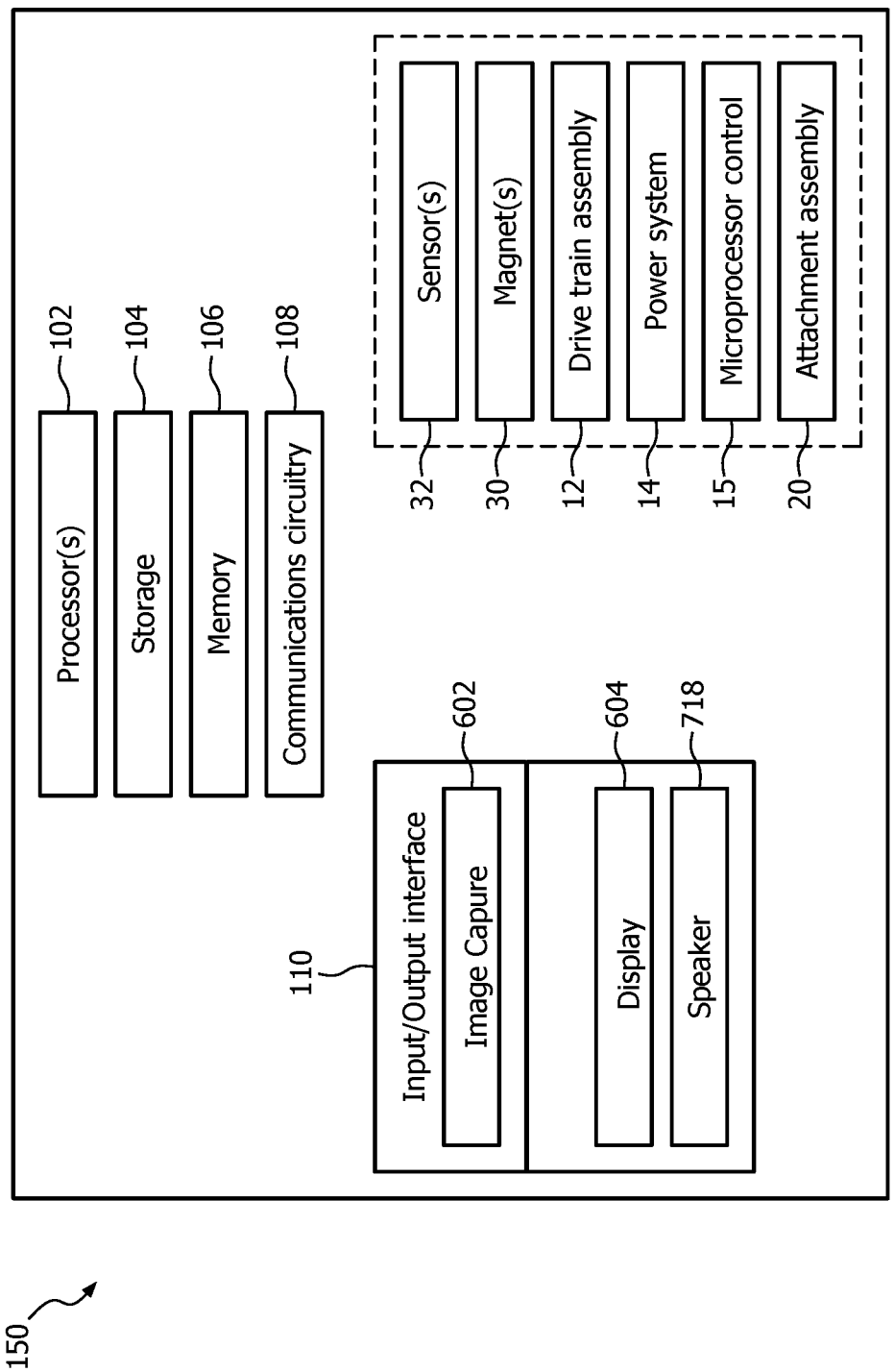
FIG. 7 is an illustrative block diagram of a user device 150 in accordance with various embodiments.

FIG. 7 is an illustrative block diagram of user device 150 in accordance with various embodiments. User device 150, may be a smartphone or tablet, or may be a base station for an electronic toothbrush (e.g., oral hygiene device 10) or electronic shaver. In yet another exemplary embodiment, user 150 also includes one or more camera for capturing images and/or videos.

User device 150, in the illustrative exemplary embodiment, includes one or more processors 102, storage 104, memory 106, communications circuitry 108, and input/output interface 110. Camera 602, in one exemplary embodiment, corresponds to any image capturing component capable of capturing images and/or videos. For example, camera 602 may capture photographs, sequences of photographs, rapid shots, videos, 3D images/videos, or any other image type, or any combination thereof.

Input/output interface 110, in the illustrative embodiment, may also include a display 604 and a speaker 718 or any other suitable mechanism or component for generating outputs. Display 604, in one embodiment, corresponds to any type of display capable of presenting content to a user and/or on user device 150. Display 604 is capable of being any size and located on one or more regions/sides of user device 150. For example, display 604 may fully occupy a first side of user device 150, or may occupy only a portion of the first side. Various display types include, but are not limited to, liquid crystal displays ("LCD"), monochrome displays, color graphics adapter ("CGA") displays, enhanced graphics adapter ("EGA") displays, variable graphics array ("VGA") displays, or any other display type, or any combination thereof. In one embodiment, display 604 is a touch screen and/or an interactive display. In another embodiment, the touch screen includes a multi-touch panel coupled to processor(s) 702 of user device 150. In still another embodiment, display 604 is a touch screen including capacitive sensing panels.

Speaker 718, in one embodiment, corresponds to any suitable mechanism for outputting audio signals. For example, speaker 718 may include one or more speaker units, transducers, or array of speakers and/or transducers capable of broadcasting audio signals and audio content to a user interfacing with user device 150. In one embodiment, speaker 718 corresponds to headphones or ear buds capable of broadcasting audio directly to a user operating user device 150.

In one exemplary embodiment, user device 150 includes one or more components of oral hygiene device 10 of FIG. 1A. For example, user device 150 may includes sensor(s) 32, magnet(s) 30, drive train assembly 12, power system 14, microprocessor control 15, and attachment assembly 20. Persons of ordinary skill in the art will recognize that although user device 150 includes one or more features of oral hygiene device 10, any number of additional components may be added, or any number of components may be removed, and the aforementioned description is merely exemplary. Furthermore, user device 150, in one embodiment, is substantially similar to oral hygiene device 100 of FIG. 1B with the exception that the former includes one or more of cameras 602, display 604, and/or speaker 718.

In one exemplary embodiment, user device 150 corresponds to oral hygiene device 10, with the exception that the former includes camera 602 embedded therein. In one embodiment, camera 602 may be external such that it protrudes from housing 18 of oral hygiene device 10 to capture images of attachment assembly 20 (e.g., the brush member 21) while interacting with the user's teeth. In another embodiment, camera 602 is embedded in attachment assembly 20. In this particular scenario, camera 602 may include one or more lights (e.g., LEDs, infrared) to illuminate a portion of the user's mouth that will be interacted with. Various landmarks within a user's mouth may then be used as a reference point to determine motion and/or quality of brushing activity. For example, a user's tongue, palate, and/or palatine uvula may be used as a "landmark" to determine where in the user's mouth oral hygiene device 10 is located. Motion is capable of being determined, in one embodiment, based on changes in captured images between one image and a subsequent image based on differences between the two images, such as differences in position of a tooth or teeth with respect to the physical landmark.

Figure 8:
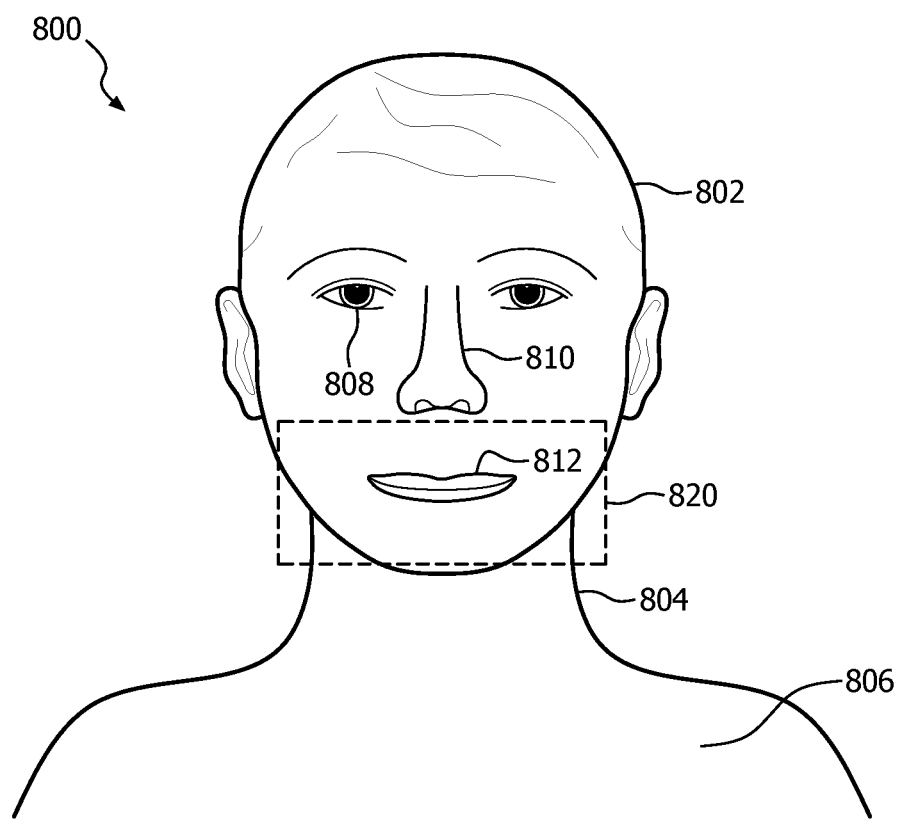
FIG. 8 is an illustrative diagram of an image 800 of a user in accordance with various embodiments.

FIG. 8 is an illustrative diagram of image 800 of a user in accordance with various embodiments. Image 800 includes a face 802, a neck 804, and a torso 806 of the user. Head 802 includes eyes 808, nose 810, and mouth 812. In one embodiment, one or more additional features may be included to describe the user including, but not limited to, ears, eyebrows, chins, cheeks, hair, and/or nostrils.

In one embodiment, a region of interest 820 is included within image 800 of the user. In one embodiment, region of interest 820 corresponds to a relevant portion of the user where motion corresponding to the user operating oral hygiene device 10, will occur, such as shown in FIG. 9. For example, region of interest 820 may, when the user is brushing their teeth, correspond to a region surrounding mouth 812. As another example, if the user is shaving, region of interest 820 may be slightly larger such that portions of the user's face 802 where one may shave are included.

In one embodiment, region of interest 820 may be predefined by the user. For example, a user may manually draw an outline of region of interest 820 on a user interface displayed on display screen 604 of user device 150. As another example, the user may be presented with region of interest 820 approximated by user device 150, and the user may manually adjust the borders of region of interest 820 such that they more appropriately conform with the user's facial structure.

In one embodiment, region of interest 820 is determined based on detection of one or more facial or body features of the user by user device 150. In one exemplary embodiment, detection of the user's face 802 and torso 806 are performed using any suitable face detector. For example, a Viola-Jones object detection framework may be used to detect region of interest 820 within image 800. In one embodiment, consecutive images captured by camera 602 of user device 150, have a Viola-Jones face detector used to determine a location of various facial features within image 800 of the user. After the various facial features (e.g., nose 810, mouth 812, etc.) are determined, Equation 1 may be used to define region of interest 820.

$$ROI = ROI_{previous} + Face_{Area} - [Face_{Coordinates} - 1.5 \times Height]$$  Equation 1

In Equation 1, ROI is the region of interest, $ROI_{previous}$ may include the entire previous image or a manually inputted region of interest from the previous image, $Face_{Area}$ is the area of face 802 within image 800 of the user, $Face_{Coordinates}$ are the coordinates defining where face 802 is within image 800, and Height is the height of the user. Persons of ordinary skill in the art will recognize that the factor of 1.5 times the Height of the user is merely an approximation of where a user's mouth would be, and any one of these variables may be modified or augmented accordingly.

In another exemplary embodiment, facial features of the user within image 800 are detected. For example, Supervised Descent Method ("SDM") may be used to detect the facial features of the user. SDM, generally, learns a series of parameter updates that, incrementally, minimize the mean of all Nonlinear Least Squares ("NLS") functions in training. SDM is especially useful in scenarios where a Newtonian image alignment method does not work (e.g., where the Hessian matrix for the image is positive definite at the local minimum but may not be elsewhere, and the function is twice differentiable).

In one embodiment, consecutive images captured by camera 602 of user device 150 define the region of interest as the area below the detected facial features using Equation 2.

$$ROI = ROI_{previous} + FF_{Area} - [Face_{Coordinates} - 1.5 \times Height] \quad \text{Equation 2}$$

In Equation 2, $FF_{Area}$ is defined as [Min(X),Min(Y),Max(X),Max(Y)] for the images captured by camera 602. In one embodiment, $ROI_{previous}$ consists of the entire image 800 or a manually inputted region of interest.

In yet another exemplary embodiment, region of interest 820 of image 800 is detected based on background subtraction techniques. For example, camera 602 of user device 150 may capture a set of consecutive images of a user, such as a video of the user, and extract a user's foreground image/mask. The facial area (e.g., face 802) is extracted, in one embodiment, using skeleton matching and region of interest 820 is defined by Equation 1. Background subtraction, generally, allows for two or more images to be compared so that a certain static portion of the images is removed to highlight a particular portion. For example, a moving image overlaid on a static background may have the static background removed using background subtraction as the static background is consistent from image to image.

In still another exemplary embodiment, region of interest 820 of image 800 is detected based on 3-D modelling. Various types of 3-D modelling include, but are not limited to, matching 3-D models with shape distributions, shape matching by object recognition using shape contexts, and symmetry descriptors for 3-D shape matching, or any other type of 3-D modelling technique, or any combination thereof. For example, one or more 3-D modelling techniques may be used to detect face 802 of image 800 to determine region of interest 820. As another example, the region of interest may be detect by selecting an area of image 800 include a specific body part of the user (e.g., the user's hands). In yet another example, 3-D shape matching may be used to match oral hygiene device 10 to a pre-computed model of an oral hygiene device to determine region of interest 820 by analyzing where oral hygiene device 10 is within image 800.

In yet still another exemplary embodiment, detection of the region of interest 820 is performed by extraction of physical landmarks on the user and/or oral hygiene device 10. In one embodiment, certain color, edge, texture, or other indicia may be used to specify where region of interest 820 should be. For example, oral hygiene device 10 may have housing 18 shaded red. In this particular scenario, user device 150 may analyze images captured by camera 602 and highlight the motion of any object that is red, thereby tracking oral hygiene device 10. In another embodiment, light-based markers, such as LEDs, are used to specify region of interest 820. For example, oral hygiene device 10 may include one or more infrared LEDs that may be recognized by user device 150 to determine region of interest 820.

Persons of ordinary skill in the art will recognize that any of the aforementioned techniques for determining region of interest 820 within image 800 of the user may be used, or any additional technique or method may be used, and the exemplary embodiments are not to be construed as limiting. Furthermore, one or more of the aforementioned techniques may also be used to determine brushing motion of the user after region of interest 820 is determined or at a substantially same time as region of interest 820 is determined. A more detailed explanation of one or more of the aforementioned techniques will also be described below and in the foregoing figures.

Figure 9A:
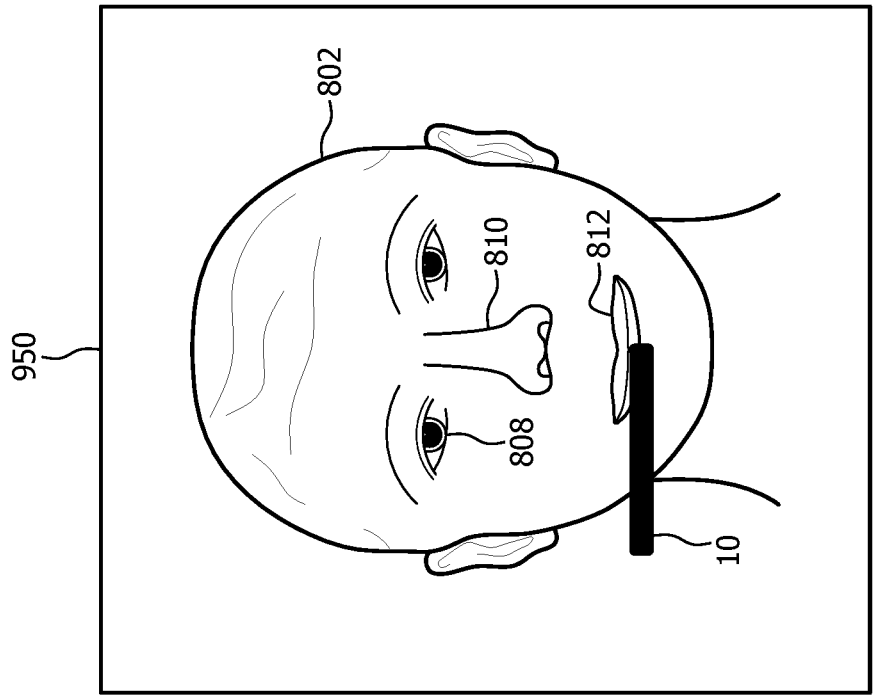
FIGS. 9A and 9B are illustrative diagrams describing a change in a location of a device 10 in accordance with various embodiments.
Figure 9B:
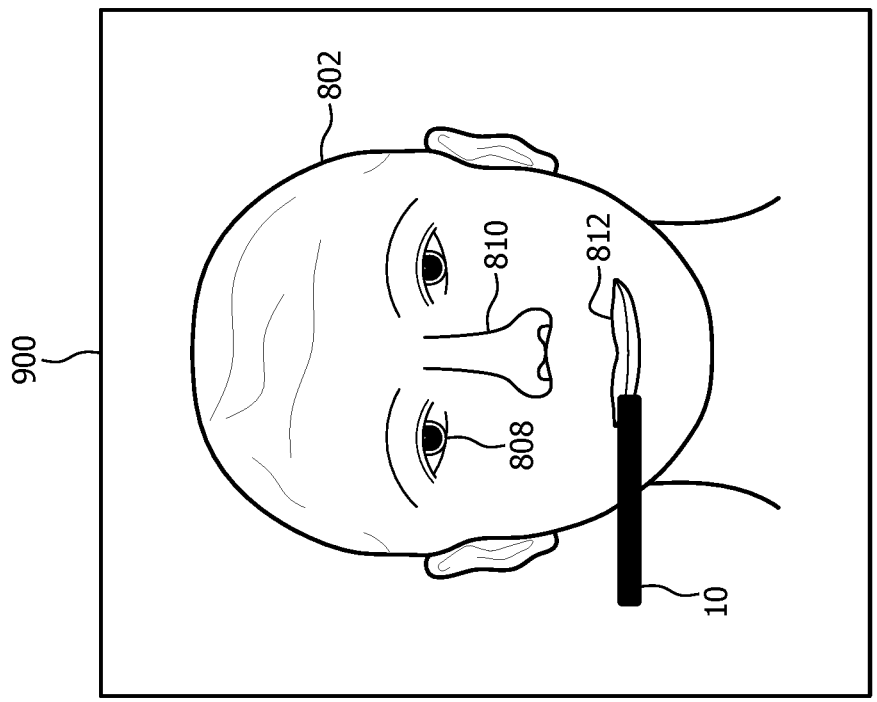

FIGS. 9A and 9B are illustrative diagrams describing a change in a location of such as oral hygiene device 10 in accordance with various embodiments. A first image 900 of a user, includes, in one embodiment, the user's face 802, eyes 808, nose 810, and mouth 812. In addition, first image 900 includes a user device which, in one exemplary embodiment, corresponds to oral hygiene device 10, or user device 150. As a user brushes their teeth, a camera, such as camera 602, captures a new location of oral hygiene device 10 within a second image 950. Oral hygiene device 10 in second image 950 is at a different position than it was in first image 900 with respect to the user within both image 900 and 950. In one embodiment, first and second images 900 and 950 are two individual images captured by camera 602 of user device 150, however first and second images 900 and 950 may also be consecutive images obtained via a video captured by camera 602.

FIG. 10 is an illustrative diagram describing a change in a location of oral hygiene device 10 based on a change in pixel position and frame in accordance with various embodiments. In the illustrative embodiment, oral hygiene device 10 from first image 900 of FIG. 9A has an initial pixel position P1, which has a two-dimensional first pixel array position (X1, Y1) and an first time when first image 900 was captured T1. Oral hygiene device 10, in second image 950, has a second pixel position P2, where the two-dimensional second pixel array position is (X2, Y2) and the second time when second image 950 was captured is T2.

Based on the coordinates (e.g., pixel and time) of oral hygiene device 10 in first image 900 and second image 950, a change in vertical displacement (e.g., $\Delta Y$) and a change in horizontal displacement (e.g., $\Delta X$) are able to be determined. Incorporating time change (e.g., $\Delta T$), an approximation on the motion of oral hygiene device 10 is obtainable. Persons of ordinary skill in the art will recognize that the aforementioned is merely an approximation, and various additional factors such as scaling, delay, and resolution, may also affect the motion characteristics of oral hygiene device 10.

FIG. 11 is an illustrative diagram describing a change in a location of oral hygiene device 10 based on a change in a position vector between oral hygiene device 10 and a reference object in accordance with various embodiments. In the illustrative embodiment, a first position vector 904A is determined by processor 102 of user device 150 that signifies a distance and/or angle between oral hygiene device 10 and a reference object, such as nose 810 of the user. Persons of ordinary skill in the art will recognize that any other reference object may be used including, but not limited to, eyes 808, mouth 812, neck 804, torso 806, or any other feature of the user or background, or any combination thereof.

First position vector 904A, in one embodiment, includes information regarding the positioning of oral hygiene device 10 with respect to nose 810 of the user in first image 900. In second image 950, the position of oral hygiene device 10 has changed, and information regarding the new position of oral hygiene device 10 withrespect to nose 810 of the user is included in a second position vector 904B. Each of position vectors 904A and 904B are analyzed by user device 150 and a relative motion of user device 902 is determined based on the change in position and timing of the change of position vectors 904A and 904B. Various techniques may be used to estimate the motion between consecutive images 900 and 950 using position vectors, such as position vectors 904A and 904B, including, but not limited to, 3DRS and Optical Flow. Persons of ordinary skill in the art will recognize that any motion extraction technique may be used, however, and the aforementioned are merely exemplary.

FIG. 12 is an illustrative diagram describing a change in a location of oral hygiene device 10 based on a change in a center of gravity of a captured image in accordance with various embodiments. In one exemplary embodiment, motion extraction is performed using absolute frame differencing techniques. For example, a binary difference image ImDiff is computed using Equation 3:

$$ImDiff = abs(ImCurrent - ImPrevious) > \text{Threshold} \quad \text{Equation 3}$$

In Equation 3, ImCurrent corresponds to the current image and ImPrevious corresponds to a previous image. For example, ImCurrent may correspond to image 950 of FIG. 9B captured by camera 602 of user device 150, whereas ImPrevious may correspond to image 900 of FIG. 9A. The difference between ImCurrent and ImPrevious is taken as the absolute value. Furthermore, in Equation 3, Threshold corresponds to a variable that may be set by the user operating user device 150 or it may be predefined by user device 150. For example, Threshold may correspond to an amount of noise associated with camera 602 and/or in the background environment.

In one embodiment, the difference between ImCurrent and ImPrevious from Equation 3 is projected along the x- and y-axis of the image plane causing two signals, ProjX and ProjY, to be formed. ProjX, in one embodiment, is defined as being the sum of ImDiff along the y-image axis for all values, whereas ProjY is defined as being the sum of ImDiff along the x-image axis for all values. The maximum value for both ProjX and ProjY is then extracted and, in one embodiment, is used as a "center of gravity" of motion. For example, a first center of gravity 906A may be represented a center of gravity between oral hygiene device 10 and nose 810 within image 900, whereas a second center of gravity 906B may represent a center of gravity between oral hygiene device 10 and nose 810 within image 950. In one embodiment, each center of gravity 906A and 906B are computed based on the ImDiff between that particular image and its previous image. Thus, center of gravity 906B, for example, may be calculated based on the maximum value of both ProjX and ProjY for images 900 and 950. In one embodiment, the difference between consecutive centers of gravity is used to determine the motion of oral hygiene device 10. For example, the difference between centers of gravity 906A and 906B may be used to determine the motion of oral hygiene device 10.

In response to extracting motion characteristics, an analysis is performed, in one exemplary embodiment, of the user's motion. By analyzing and characterizing the user's motion, the raw motion signals (e.g., data acquired via one or more of camera 602 and/or sensor(s) 32) may be transformed into various motion features, such as motion frequency, motion amplitude, and/or motion trajectory.

In one embodiment, analysis is performed by pre-processing of the acquired data. For example, various data reduction techniques may be employed to emphasize information within the acquired data corresponding to motion of the user device (e.g., oral hygiene device 10), and this information may be combined into a single, new motion component. Various data reduction techniques include, but are not limited to, Principle Component Analysis ("PCA"), Independent Component Analysis ("ICA"), application of a low/high band-pass filter, or any other data reduction technique, or any combination thereof. For example, a low band-pass filter with a 4 Hz cutoff may be used to remove unwanted high-frequency data.

In another embodiment, the analysis includes performing a frequency characterization. Motion frequency, in one embodiment, is extracted by using a Fourier analysis to find dominant motion frequency via maximum amplitude detection. For example, motion components may be windowed using a Hanning window, and then sent to a FFT, where the dominant frequencies may be extracted by the index of the maximal frequency amplitude. In one embodiment, frequency characterization includes obtaining motion frequency from the acquired data by extracting extrema (e.g., minima and/or maxima), or the number of zero crossings, from the motion components. Furthermore, as previously discussed, amplitude characterization, in one embodiment, is performed using any suitable technique.

In one exemplary embodiment, no data reduction techniques are needed. Here, the motion characteristics (e.g., amplitude characteristics and/or frequency characteristics), are obtained using one or more additional techniques. For example, the x-direction and/or y-direction characteristics of the motion may be combined. As another example, a linear combination of the x-direction and/or y-direction characteristics of the motion may be used. In yet another example, characteristics corresponding to the strongest frequency component with respect to the amplitude component may be used. In still yet another example, characteristics corresponding to the frequency component that is closest to, or furthest from, the targeted frequency component may be used. Persons of ordinary skill in the art will recognize that the use of "x-direction" and "y-direction" is merely illustrative, and any two directions may be used instead (e.g., x- and y-direction, x- and z-direction, y- and z-direction). Furthermore, persons of ordinary skill in the art will recognize that the targeted frequency and/or strongest frequency component may correspond to any frequency component within the frequency spectrum of the system, and may be chosen prior to implementation and/or varied while performing data analysis.

Figures 13, 14:
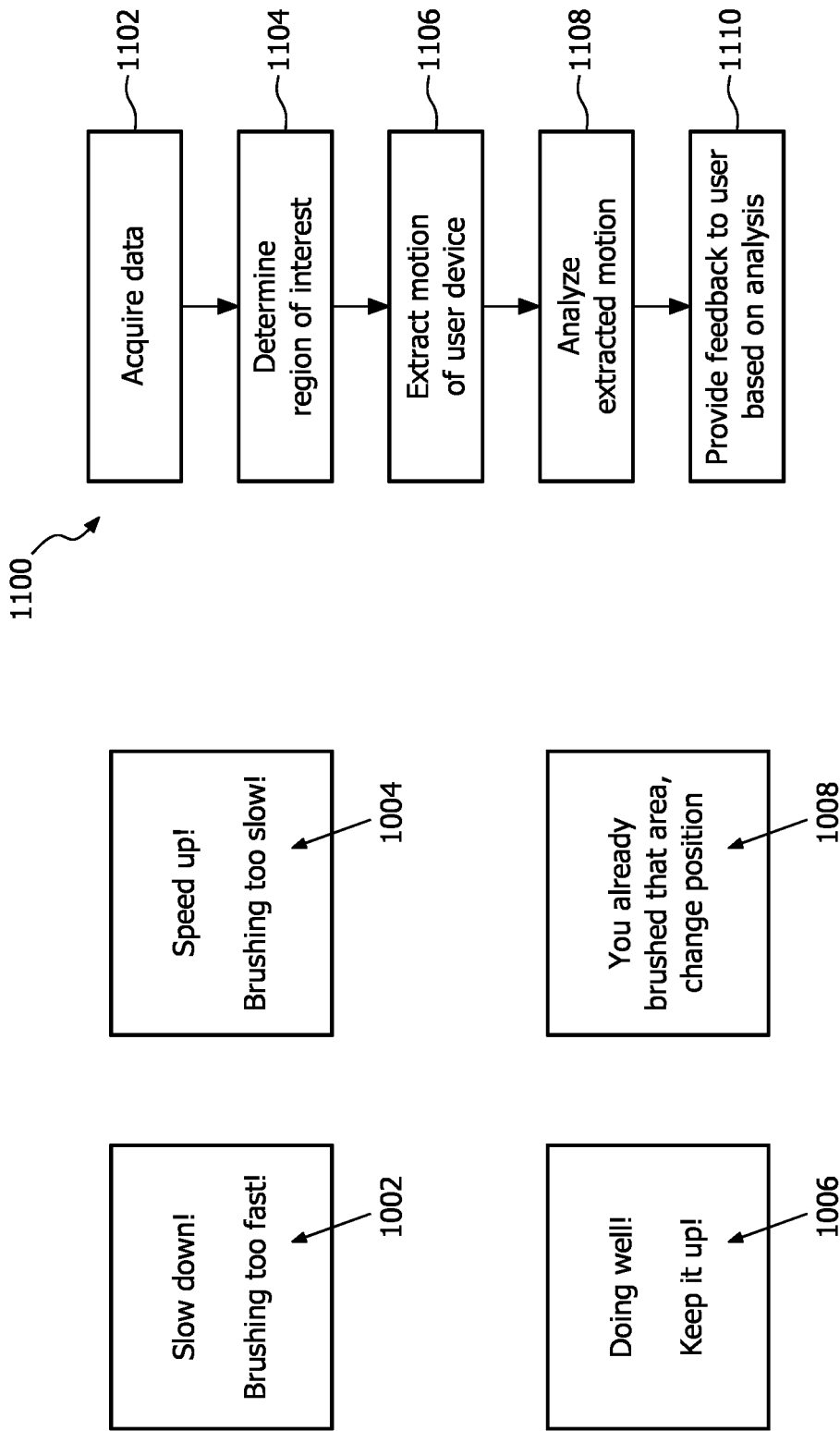
FIG. 13 is an illustrative diagram of various user interfaces in accordance with various embodiments.
FIG. 14 is an illustrative flowchart of a process 1100 in accordance with various embodiments.

FIG. 13 is an illustrative diagram of various user interfacesin accordance with various embodiments. User interfacesdisplay various graphics including feedback provided to the user operating oral hygiene device 10, or user device 150. For example, if it is determined that the user is brushing their teeth too quickly, display 604 of user device 150 may present user feedback message 1002. As another example, if it is determined that the user is brushing their teeth too slow, display 604 of user device 150 may present user feedback message 1004 advising the user to speed up. As yet another example, if it is determined that the user is correctly brushing their teeth, then display 604 of user device 150 may present user feedback message 1006. As still yet another example, if it is determined that the user is brushing a portion of their teeth that was already brushed, or they are brushing a certain area for too long a period of time, display 604 of user device 150 may present user a feedback message 1008 advising the user to change the position of their brushing.

FIG. 14 is an illustrative flowchart of a process 1100 in accordance with various embodiments. Process 1100 begins at step 1102. At step 1102, data is acquired from one or more cameras located on a user device. For example, camera 602 of user device 150 may capture one or more images and/or videos of a user brushing his/her teeth with oral hygiene device 10). As another example, the data may be acquired using a CMOS or CDD image sensor, as well as, or in addition to, a 3D camera system. Furthermore, in one embodiment, the acquired data includes data obtained from one or more captured images/videos and one or more sensors, such as sensor(s) 32 (e.g., a Hall Effect sensor, a Force sensor, and/or an accelerometer) of oral hygiene device 10. For example, user device 150 may capture video of the user using oral hygiene device 10 while also obtaining data from sensor(s) 32.

The acquisition rate of camera 602, in one embodiment, enables relevant motion information to be extracted. For example, motion frequency and/or motion amplitude are extractable from the images captured by camera 602. In one embodiment, the acquisition rate of camera 602 is set to be at least twice the expected maximum motion frequency. For example, if the expected motion frequency is 10 Hz, the acquisition rate will be 20 Hz.

In one exemplary embodiment, an additional step (not shown) of pre-processor the acquired data occurs. This optional step may be substantially similar to steps 504 of process 500. For example, pre-processing of the acquired data may downscale the image by a factor of four (4) to reduce relatively large images captured by camera 602.

In another exemplary embodiment, video channel reduction may occur for video images captured by camera 602 of user device 150. For example, red, green, and blue channels of the captured video may be converted into a single luminance channel using Equation 4:

$$Y = 0.299\,R + 0.587\,G + 0.114\,B \quad \text{Equation 4}$$

In Equation 4, Y is the single luminance channel, R is the red channel, G is the green channel, and B is the blue channel. Persons of ordinary skill in the art will recognize that the coefficients for each of the red, green, and blue channel may be modified accordingly depending on the desired settings, and the use of the coefficients in Equation 4 are merely exemplary.

As another example, any input channel of the video captured by camera 602 may be combined using any linear or non-linear combination of the input channels. As still yet another other example, only one video channel, such as a green video channel, may be used. In this particular scenario, the green video channel may be used as it typically includes most of the video signal's energy.

At step 1104, a region of interest is determined. The region of interest is an area or portion of an image of a user that an appropriate motion analysis will target. For example, a user brushing his/her teeth will have region of interest 820 corresponding to an area surrounding and including his/her mouth. For different activities, such as shaving, hair maintenance, flossing, etc., region of interest 820 may change accordingly to include portion(s) of the user's image that include the intended areas where the motion will occur.

Various techniques may be used to determine the region of interest. For example, the region of interest may be predefined by the user and/or the user device, or the region of interest may be selected by the user. In one embodiment, the region of interest is determined automatically based on feature detection. For example, a user's face and chest may be detected using a Viola-Jones face detector or SMD in conjunction with Equation 2. As another example, background subtraction techniques may be used to determine the region of interest, as well as 3-D modelling, and/or physical marker extraction.

At step 1106, the motion of the device is extracted using the region of interest as determined in step 1104. The extraction of the motion of the device may be performed using a variety of techniques. In one embodiment, motion estimation techniques are used to extract the motion. For example, motion vectors are extracted using motion estimation between consecutive images (e.g., using 3DRS and/or Optical Flow techniques). In one embodiment, object tracking is used to extract the motion. For example, the motion is extracted by tracking a real or virtual object (e.g., oral hygiene device 10), or the relative distance between an object and a landmark (e.g., a vector between oral hygiene device 10 and nose 810 of the user). In yet another embodiment, absolute frame differencing is used to extract the motion. Here, a binary difference image between a first image and a second image is computed, and then a maximum value along each axis of the image is determined and used as a center of gravity for the motion. The various centers of gravity are then used in consecutive images to determine the motion.

At step 1108, the extracted motion is analyzed and decomposed into various components, such as motion frequency, motion amplitude, and/or motion trajectory. In one embodiment, pre-processing is used to reduce the data. For example, a PCA, ICA, or a band-pass filter may be applied to the data to remove irrelevant or unneeded information. In one embodiment, frequency characterization is performed to extract motion frequency. For example, motion frequency may be extracted using Fourier analysis to detect a dominate motion frequency and/or by extracting extremas or zero crossings in the motion components. In one embodiment, amplitude characterization is performed to extract motion amplitude. For example, the distance between consecutive extremas, a dominate frequency in the Fourier representation, and/or an envelope of the motion components may be used to extract motion amplitude.

At step 1110, feedback is provided to the user based on the analysis performed at step 1108. In one embodiment, the motion characteristics are compared to a targeted motion stored on the user device. For example, a predefined targeted motion of a user brushing their teeth may be stored in storage 104 or memory 106 on user device 150. After motion of the user device (e.g., oral hygiene device 10) is extracted, it may be analyzed by comparing it to the predefined target motion. The results of this analysis are the capable of being presented to the user on display 604 of user device 150 so that the user is able to modify their motion to conform with the predefined targeted motion. For example, display 604 may present user interfaces 1002, 1004, 1006, or 1008 of FIG. 11, or user interfaces 200, 300, 300', and/or 400.

In one embodiment, the motion characteristics are used to compute a score presented to the user either in real-time or after the motion is performed. For example, as seen in FIG. 4, user interface 400 includes various scores of a user for brushing sessions. The scores are computed and capable of being presented to the user so that they are able to see days or times when their brushing was good or bad. As another example, a user may be presented with user interfaces 300 or 300', which may allow a user to see in real-time how well they are adhering to target brushing window 310. If their brushing is too low (e.g., user interface 300) the user may modify their brushing to increase pressure and/or frequency, whereas if their brushing is too great (e.g., user interface 300'), the user may modify their brushing to decrease pressure or frequency.

FIG. 15 is an illustrative diagram of oral hygiene device 10 being used in accordance with various embodiments. Patient interaction system 1200 includes, in one exemplary non-limiting embodiment, face 802 and mouth 812 of a patient operating oral hygiene device 10. When a patient brushes their teeth, tongue, gums, etc., the patient moves oral hygiene device 10 such that a scrubbing motion occurs about the patient's teeth (see FIGS. 16A-E).

Depending on an orientation of the patient's teeth, the motion of oral hygiene device 10 when the patient brushes their teeth (e.g., the direction of scrubbing) varies. For example, a patient may move oral hygiene device 10 in a first and second direction, as seen by arrow 1202, or oral hygiene device 10 may be moved in a third and fourth direction, as seen by arrow 1204. Moving oral hygiene device 10 along the first and second direction may, for example, be better suited for cleaning of a patient's front teeth, whereas moving oral hygiene device 10 along the third and fourth directions may be better suited for cleaning a patient's back teeth. However, persons of ordinary skill in the art will recognize that oral hygiene device 10 may be moved in any suitable direction to perform a brushing or scrubbing action, and the aforementioned are merely exemplary. Furthermore, the patient may brush one or more teeth along one or more directions (e.g., a front tooth or teeth may be brushed along the directions of both arrows 1202 and 1204).

FIGS. 16A-E are illustrative diagrams of attachment assembly 20 of an oral hygiene device being used to brush one or more teeth 1304 in accordance with various embodiments. Patient mouth 812, in the illustrated exemplary embodiment, includes gums 1302 having a plurality of teeth 1304. Patient's mouth 812 may correspond to an upper or lower portion of a patient's mouth, such as an upper maxillary portion or a lower mandibular portion.

Figure 16C:
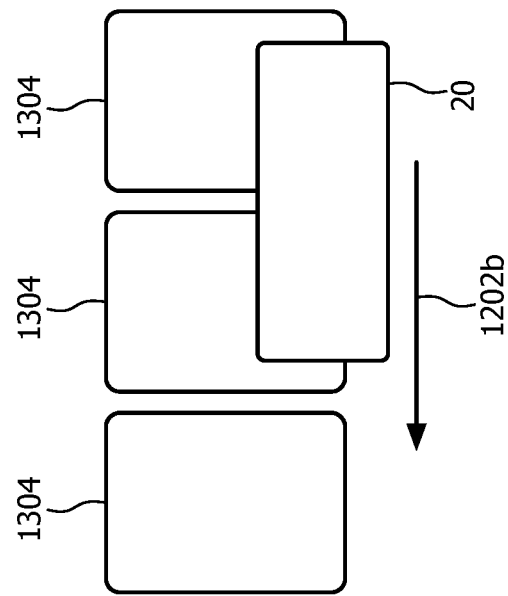
Figure 16B:
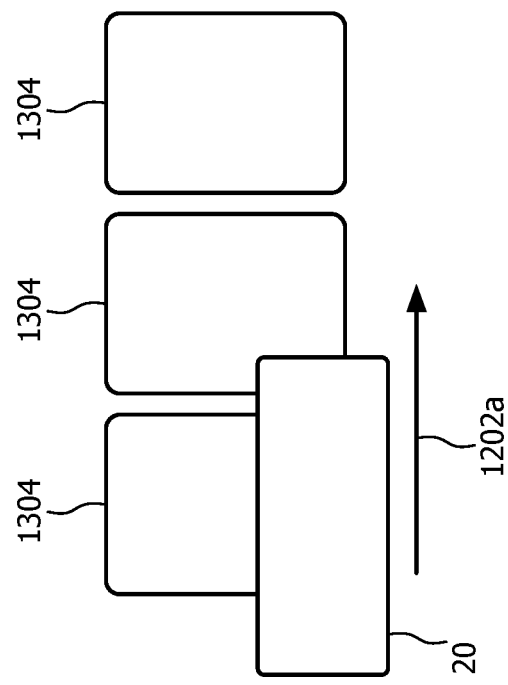

A patient, in one embodiment, moves attachment assembly 20 of oral hygiene device 10 along a first direction 1202a to provide a scrubbing action to teeth 1304. The scrubbing action, or brushing motion, may be performed in any suitable direction such that attachment assembly 20 moves along gums 1302 having teeth 1304 therein. As seen in FIGS. 16B and 16C, attachment assembly 20 moves perpendicular to a face of teeth 1304. For example, attachment assembly 20 of oral hygiene device 10 may brush an outer surface of teeth 1304 and/or an inner surface of teeth 1304.

As attachment assembly 20 moves back and forth along a first direction 1202a and a second direction 1202b, one or more sensors 32 within oral hygiene device 10, are capable of detecting the movement of attachment assembly 1306. For example, sensors 32 of oral hygiene device 10 may correspond to one or more accelerometers. Various types of accelerometers include, but are not limited to, standalone accelerometers, parts or all of one or more inertial measurement units ("IMUs"), gyroscopes, and/or magnetometers. The accelerometers may also be single or multi-axis accelerometers. For example, various single axis accelerometers may be used within oral hygiene device 10, to detect changes in motion of oral hygiene device 10 along multiple axes (e.g., x-, y-, and/or z-axis). As another example, multi-axes accelerometers may be used to detect motion of oral hygiene device 10 along two or more axes (e.g., x and y-axis, x and z-axis, y and z-axis, or x, y, z-axis). In one particular embodiment, oral hygiene device 10 includes at least one accelerometer along a longitudinal axis of drive shaft 23. In one exemplary embodiment, a blind analysis may be performed using various multi-axes and/or single axis accelerometers. For example, the various multi-axes and/or single axis accelerometers may be capable of detection motion in all spatial directions and analyzing an amount of energy, frequency, and/or amplitude detected along each axis. The motion of oral hygiene device 10 is then capable of being reconstructed based on the determined motion.

In one embodiment, processor(s) 102 of oral hygiene device 10 and/or user device 150 set the acquisition rate of the accelerometers within oral hygiene device 10 to be at least twice an expected maximum motion frequency of the brushing/scrubbing. The accelerometers detect the motion of oral hygiene device 10 as they move along various axes to perform a brushing motion (e.g., move along directions 1202a and/or 1202b). When the motion detected by the accelerometer corresponds to proper brushing/scrubbing technique, processor(s) 102 of oral hygiene device 10 and/or user device 150 provide information (as described below) that the brushing motion is correct. If the detected motion by the accelerometer corresponds to incorrect brushing/scrubbing technique, processor(s) 102 of oral hygiene device 10 and/or user device 150 provide information.

Figure 16E:
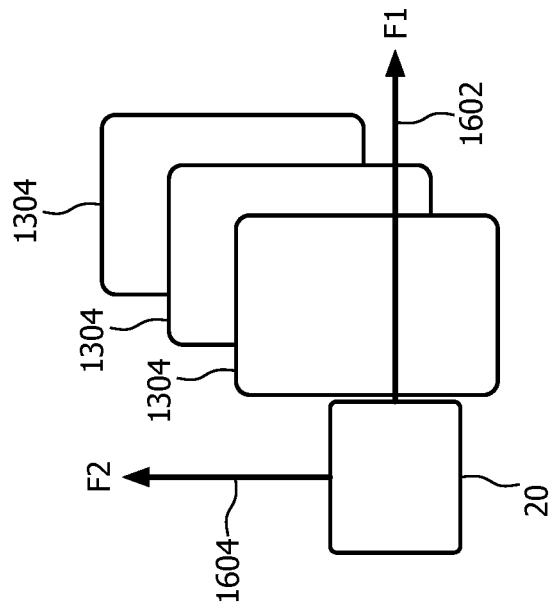
Figure 16D:
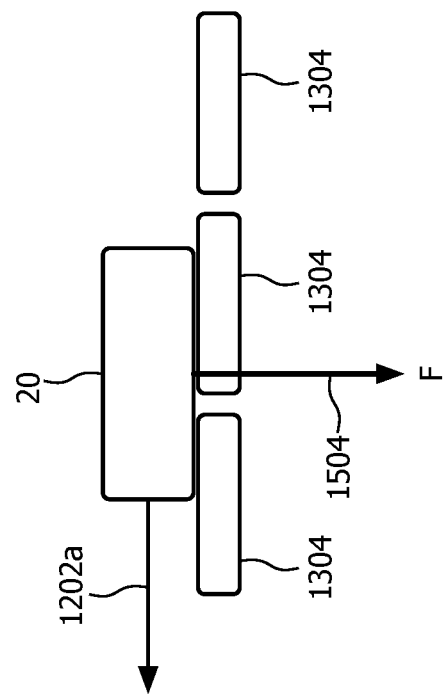

FIGS. 16D and 16E are various perspective views of the brushing motion described in FIGS. 16B and 16C, in accordance with various embodiments. To provide proper oral hygiene care, a patient should brush their teeth 1304 such that a minimal amount of side force occurs on attachment assembly 20 (e.g., such as a brush head) of oral hygiene device 10. As attachment assembly 20 moves along a direction 1202a, attachment assembly 20 also provides a force F in a direction 1504, which is perpendicular to the direction of motion 1202 and parallel and opposite to an outer surface of teeth 1304. For example, force F allows for bristles on attachment assembly 20 to interact with teeth 1304 to remove plaque, water, toothpaste and/or other elements from teeth 1304 and/or gums 1302 to clean teeth 1304 and/or gums 1302.

As a user brushes their teeth 1304, a minimal amount of side force should be applied to attachment assembly 20 such that a maximal amount of normal force F is applied to teeth 1304. Persons of ordinary skill in the art will recognize that although a minimal amount of side force is applied to attachment assembly 20, the applied normal force F plus frictional effects may cause a non-zero amount of side force to be detected by attachment assembly 20. As seen in FIG. 16E, attachment assembly 20 of oral hygiene device 10, when moving in direction 1402 and/or 1454, has a force F1, 1602,applied to an outer surface of teeth 1304 such that a side force F2, 1604 is as small as possible. In one particular example, the amount of side force F2 is zero. As described in greater detail above, minimizing side force F2 provides maximal brushing efficacy. In some embodiments, in addition to determining an amount of motion of attachment assembly 20 (and thus, oral hygiene device 10), accelerometers (e.g., sensors 32) may also be able to determine an angle that attachment assembly 20 is interacting with teeth 1304. For example, oral hygiene device 10 may include one or more accelerometers that measure motion and one or more accelerometers that measure an amount of gravitational force or gravitational acceleration of oral hygiene device 10. Oral hygiene device 10 and/or user device 150 are capable of comparing the direction of motion measured by the one or more accelerometers measuring motion of oral hygiene device 10 with a direction or orientation of the gravitational force as detected by the gravitational accelerometer(s) to determine an angle between the direction of motion and gravity.

Figure 17:
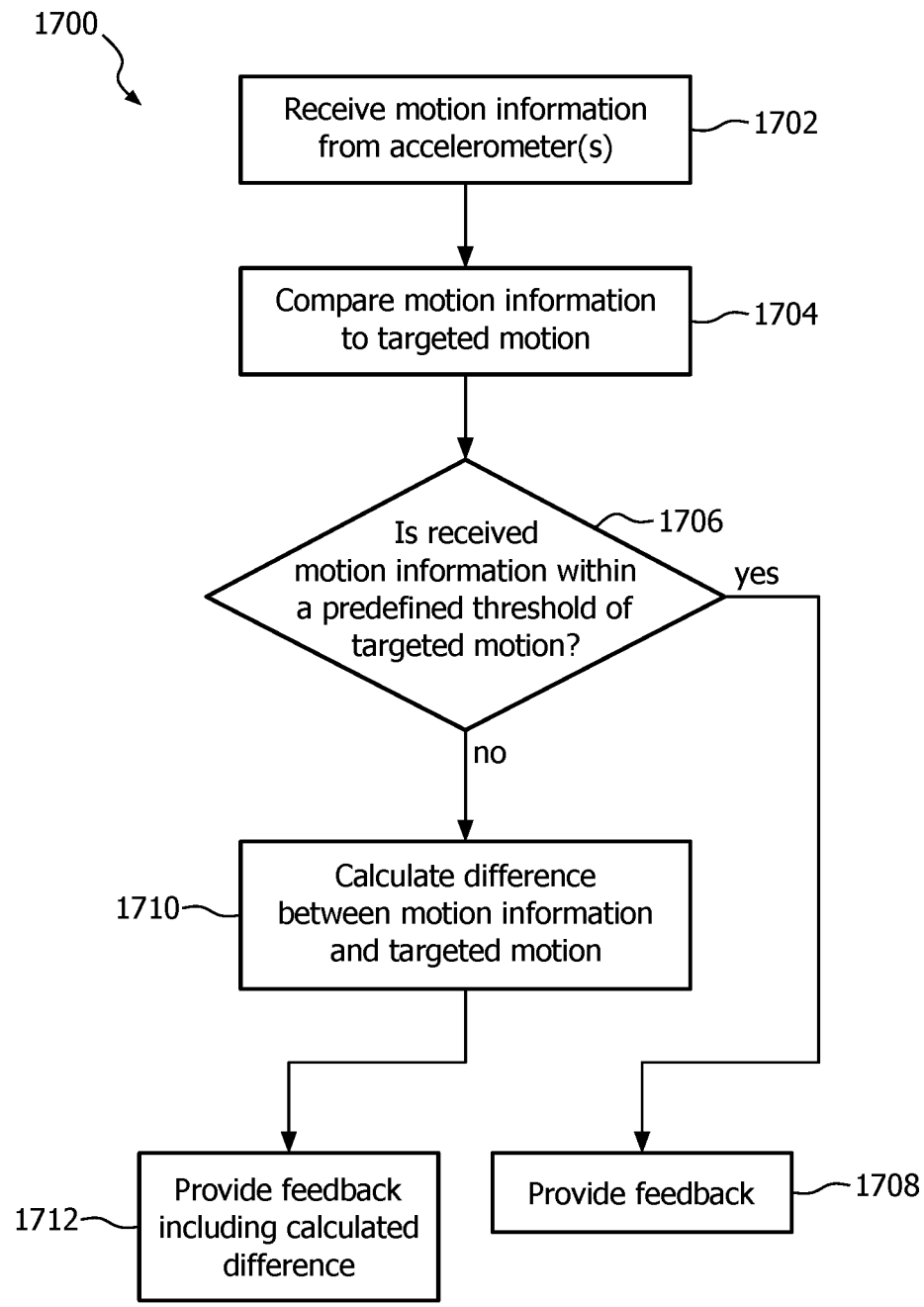
FIG. 17 is an illustrative flowchart of process 1700 in accordance with various embodiments.

FIG. 17 is an illustrative flowchart of process 1700 in accordance with various embodiments. Process 1700, in one embodiment, begins at step 1702. At step 1702, motion information is received from one or more accelerometers located on or within oral hygiene device 10. For example, as a patient brushes their teeth using oral hygiene device 10, sensor(s) 32, such as one or more accelerometers, located thereon detect information corresponding to a displacement, velocity, acceleration, and/or angle of the motion of oral hygiene device 10. In one exemplary embodiment, sensor(s) 32 (e.g., an accelerometer) on oral hygiene device 10 detects information corresponding to a motion of oral hygiene device 10, which is transmitted to user device 150, 700 for processing and/or analysis. For example oral hygiene device 10 may transmit motion information detected by sensors 32 (e.g., accelerometers) to user device 150 using communications circuitry 108.

At step 1704, the motion information received at step 1702 is compared to a targeted motion for brushing of teeth 1304 using oral hygiene device 10, For example, a frequency of the brushing motion may be detected by sensor(s) 32 (e.g., accelerometers) located on oral hygiene device 10, which may be compared to a predefined frequency value or frequency range corresponding to proper or correct brushing. In one embodiment, the predefined frequency value is stored in memory 106 on oral hygiene device 10 or user device 150. The predefined frequency value, in one embodiment, corresponds to a range of frequency values associated with proper or correct brushing motion. For example, frequency values corresponding to correct brushing motion may correspond to 1-5 Hz, however any suitable frequency or range of frequencies may be used.

At step 1706, a determination is made as to whether the received motion information is within a predefined threshold of the targeted motion. For example, at step 1704, the motion of oral hygiene device 10 may be compared to the targeted motion of oral hygiene device 10 corresponding to proper or correct brushing technique. If the comparison determines that the difference between the brushing motion detected by the accelerometers and the targeted motion is less than a predefined threshold value then process 1700 proceeds to step 1708. If the difference between the detected brushing motion is greater than the predefined threshold value then process 1700 proceeds to step 1710. For example, if the targeted brushing motion for proper brushing using oral hygiene device 10 is between 1-5 Hz and the detected motion is 3 Hz, then oral hygiene device 10 is within the threshold range for proper brushing. If, however, the detected motion is 10 Hz, then the brushing motion of oral hygiene device 10 is not within the threshold values for proper brushing.

In some embodiments, the comparison that occurs at step 1706 may be a binary decision. For example, the detected frequency of the received motion of oral hygiene device 10 may be compared to the targeted brushing motion for oral hygiene device 10. If the detected motion is lower than a maximum threshold frequency value or greater than a minimal threshold frequency value, then the detected motion is considered to be correct. However, if the detected motion is greater than the maximum threshold frequency value or less than the minimal threshold frequency value, then the detected motion is considered to be correct. In one embodiment, the comparison may be a continuous decision where a position in the frequency range is used to determine a score for the brushing motion (e.g., see below). For example, a range of frequencies for a targeted brushing motion may be between 1-9 Hz. If the detected frequency is 5 Hz, the score may be 50%, whereas if the detected frequency is 1 Hz or 9 Hz, the score may be 100% or 0%, respectively. However, persons of ordinary skill in the art will recognize that the comparison techniques described above are merely exemplary and any comparison technique may be used.

If, at step 1706, it is determined that the received motion information, as compared to the targeted motion information, is within a predefined threshold value, then process 1700 proceeds to step 1708 where feedback is provided to a user operating oral hygiene device 10 and/or user device 150. In one exemplary embodiment, the provided feedback is haptic feedback. For example, the provided haptic feedback may be a vibration of oral hygiene device 10. As another example, the provided haptic feedback may be an audible sound or tone outputted by oral hygiene device 10, or by user device 150. In another exemplary embodiment, the feedback provided to the user operating oral hygiene device 10 is visual. For example, a user interface including one or more images may be presented on display 604 of user device 150, or oral hygiene device 10. Various types of feedback presented to the user operating oral hygiene device 10 may include positive feedback, instructions or information regarding the brushing motion of oral hygiene device 10, or any other type of information, or any combination thereof. As an illustrative example, a user may be presented with user interface 200, 300, 300', and/or 400.

If, at step 1706, it is determined that the brushing motioned of oral hygiene device 10 is not within the predefined threshold of the targeted brushing motion, process 1700 proceeds to step 1710 where a difference between the received motion information measured by the accelerometers on oral hygiene device 10 and the targeted brushing motion comparison performed at step 1704 stored in memory 106 of oral hygiene device 100 or user device 150 is calculated. In one exemplary embodiment, as described previously, a determination is made as to whether the received motion information is less than, or greater than, a predefined threshold frequency value. In this particular scenario, the received motion information does not meet the predefined threshold frequency value, and the difference between the received motion information (e.g., a frequency of motion) and the targeted brushing motion frequency is calculated. For example, the received motion information from the accelerometers located on oral hygiene device 10, may indicate that the user is moving oral hygiene device 10 at a frequency of 15 Hz. In this particular example, the targeted brushing motion frequency may be 5 Hz, and a threshold frequency value for the targeted motion may be +/−4 Hz (e.g., between 1-9 Hz). Thus, the calculated difference between the motion of oral hygiene device 10 and the targeted brushing motion for oral hygiene device 10 may be 10 Hz. However, persons of ordinary skill in the art will recognize that the motion information and the targeted brushing motion information described above are merely exemplary. Furthermore, persons of ordinary skill in the art will recognize that the calculated difference between the received brushing motion information of oral hygiene device 10 and the targeted brushing motion may also include a difference between the received motion information and the threshold value for the targeted brushing motion. For example, using the scenario described previously, the difference between the frequency of motion of oral hygiene device 10 and an upper limit of the targeted motion frequency may be 6 Hz. This may allow a user to know approximately how close (or how different) they are to being within the range of proper or correct brushing technique.

At step 1712, feedback is provided to the user operating oral hygiene device 10 that includes, in one embodiment, the calculated difference between the received motion information and the targeted brushing motion. For example, a user may be provided with haptic feedback in response to the received motion information not being within the predefined threshold of the targeted information. The provided haptic feedback, in one embodiment, corresponds to a vibration or buzzing of oral hygiene device 10, which may indicate to the user that their brushing motion is incorrect. After the haptic feedback occurs, the user may be able to view, either on oral hygiene device 10 or on user device 150, the calculated difference between the motion information of oral hygiene device 10 and the targeted brushing motion. For example, display 604 of oral hygiene device 100 and/or user device 150, may have a graphical user interface displayed thereon that includes the calculated difference between the brushing motion of oral hygiene device 10 and the targeted brushing motion. In one embodiment, the feedback provided to the user is visual feedback, and no haptic feedback is provided. In yet another embodiment, audible feedback, such as an audio tone, is played through oral hygiene device 100 and/or user device 150 in addition to, or instead of, the haptic and/or visual feedback.

Figure 18:
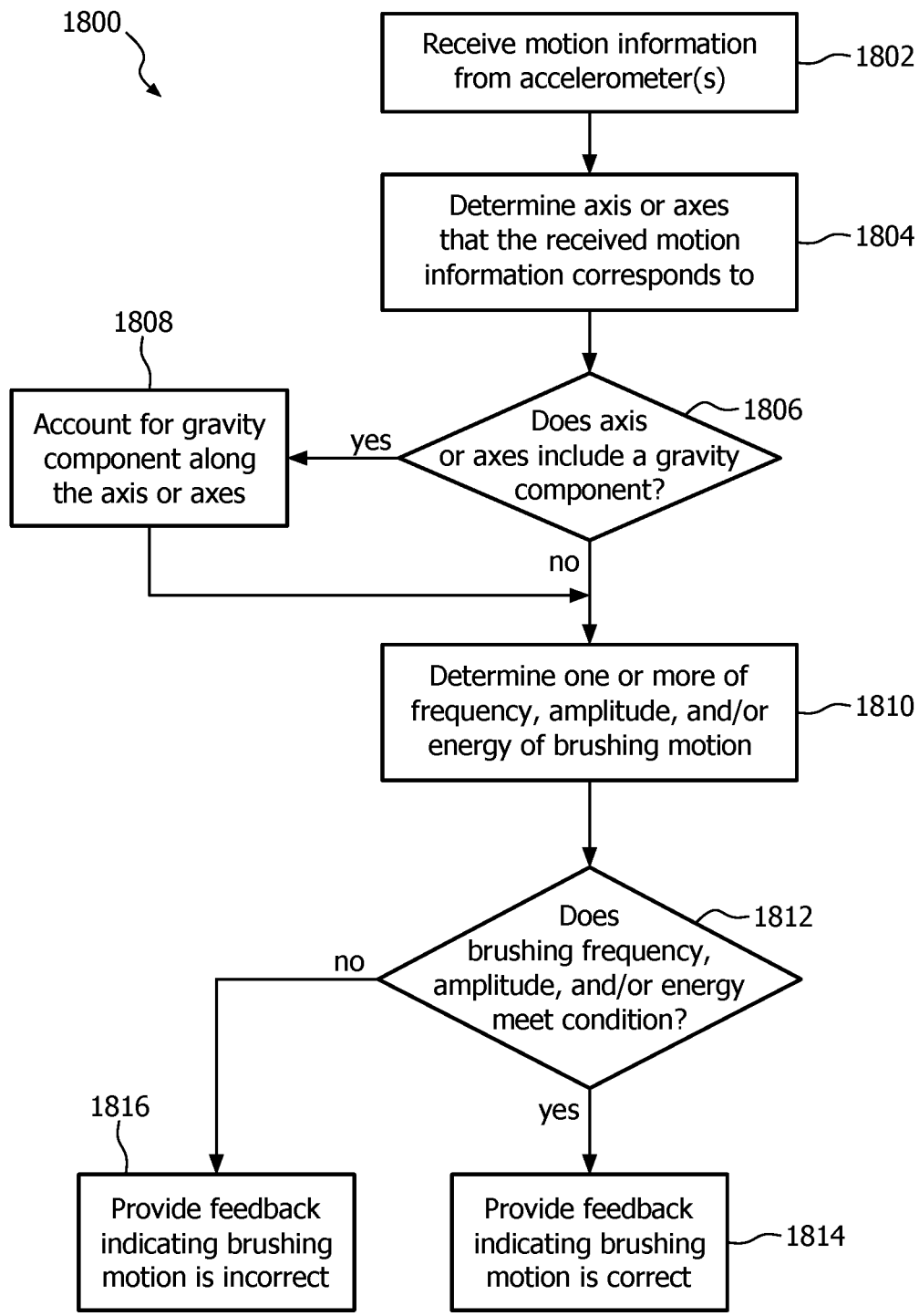
FIG. 18 is an illustrative flowchart of a process 1800 in accordance with various embodiments.

FIG. 18 is an illustrative flowchart of process 1800 in accordance with various embodiments. Process 1800 begins at step 1802 where motion information is received from one or more accelerometers (e.g., sensors 32) located on oral hygiene device 10, 100. For example, accelerometers located on oral hygiene device 10 may measure an acceleration and/or motion (e.g., magnitude and/or direction) of oral hygiene device 10 while it is being used to brush a patient's teeth (e.g., teeth 1304). In one exemplary embodiment, step 1802 of process 1800 is substantially similar to step 1702 of process 1700, and the previous description applies.

At step 1804, one or more axis that the received motion information corresponds to is determined. For example, the accelerometers on oral hygiene device 10 may be single or multi-axes accelerometers. If the accelerometers on oral hygiene device 10 are single axis accelerometers, processors 102 of oral hygiene device 10 and/or user device 150 may determine which accelerometers detected motion. For example, the detected motion may be only along the x-axis accelerometer. As another example, the detected motion may be along both the x-axis accelerometer and the z-axis accelerometer. This may provide information regarding an axis or axes of motion for oral hygiene device 10. If the accelerometers on oral hygiene device 10, 100 are multi-axis accelerometers, processors 102 of oral hygiene device 10 and/or user device 150 may determine which axis or axes the motion of oral hygiene device 10 occurs on from the multi-axis accelerometers.

As an illustrative example, oral hygiene device 10 may include three single axis accelerometers, such as an x, y, and z axis accelerometer. Processors 102 of oral hygiene device 10 and/or user device 150 may determine that only the x-axis accelerometer has detected motion, and therefore may determine that the motion of oral hygiene device 10 is only along the x-axis. As another illustrative example, processors 102 of oral hygiene device 10, also including three single axis accelerometers, may determine that the x-axis accelerometer and the z-axis accelerometer have both detected motion. Thus, in this particular scenario, the motion of oral hygiene device 10 may be along a portion of the x-axis and the z-axis. As still yet another example, processors 102 of oral hygiene device 10 may include 3 multi-axis accelerometers, such as an x-y axis accelerometer, an x-z axis accelerometer, and a y-z axis accelerometer. In this particular scenario, the x-y axis accelerometer may have detect motion, whereas the x-z and y-z axis accelerometer have not. Thus, processors 102 of oral hygiene device 10 may determine that the motion of oral hygiene device is along an x-y axis. However, persons of ordinary skill in the art will recognize that the aforementioned is merely exemplary, and if motion is detected by an x-y axis accelerometer, some motion may also be detected along an x-z axis accelerometer (an x-axis component) and a y-z axis accelerometer (a y-axis component).

At step 1806, a determination is made as to whether the axis or axes that the motion information is determined to correspond to includes a gravity component. In one exemplary embodiment, a gravity may be assigned to be aligned with the z-axis. However this is merely exemplary, and the axis of gravity may vary depending on the specific embodiment or application oral hygiene device 10 is used for. If, at step 1806, it is determined that the axis the motion information corresponds to includes a gravity component then process 1800 proceeds to step 1808. At step 1808, the gravity component is accounted for along that axis or axes. For example, in the aforementioned example using three single axis accelerometers, an x-axis accelerometer and a z-axis accelerometer may have both detected motion. The z-axis, as described previously, may corresponds to an axis of gravity, and therefore the motion detected along the z-axis may include a component due to gravity. Thus, processors 102 of oral hygiene device 10 and/or user device 150 may account for the gravitational component and modify the output used for analysis from that accelerometer (e.g., the z-axis accelerometer). In one embodiment, an accelerometer that has motion detected along its axis that corresponds to gravity may have its outputs suppressed. For example, if the z-axis corresponds to gravity, an accelerometer detecting motion along the z-axis may have its output suppressed or weighted differently to negate or minimize the effects of gravity for the motion of oral hygiene device 10. In one embodiment, the one or more accelerometers located on oral hygiene device 10 are not be aligned with an axis of gravity. In this particular scenario, more than one accelerometer may detect a gravitational component. Thus, various component breakdowns of the motion of oral hygiene device 10 may occur using processors 102 to determine a direction and magnitude of the gravitational component. After the gravitational component has been determined along each accelerometer, the gravitational component is accounted for along that accelerometer, and process 1800 proceeds to step 1810.

If, however, at step 1806, it is determined that the axis or axes that the received motion information for oral hygiene device 10 does not include a gravitational component, process 1800 proceeds to step 1810. At step 1810, one or more of: frequency value, an amplitude value, and an energy value of the brushing motion is determined. For example, processors 102 of oral hygiene device 10 and/or user device 150 may analyze the motion information detected by the accelerometers (e.g., sensors 32) and determine a frequency of the brushing motion that oral hygiene device 10 has when brushing teeth 1304. As another example, the motion information may be analyzed to determine an amount of energy within the brushing motion. In one embodiment, the energy may include information regarding the amplitude and/or frequency of the brushing motion. However, persons of ordinary skill in the art will recognize that the motion information may focus or include any amount of information corresponding to the brushing motion detecting by the one or more accelerometers on oral hygiene device 10, and the aforementioned is merely exemplary.

After one or more of the frequency, amplitude, and/or energy of the brushing motion is determined, a query is run at step 1812 to assess whether the determined brushing frequency, amplitude, and/or energy meets a predefined condition corresponding to correct or proper brushing motion for oral hygiene device 10. For example, a threshold frequency value, amplitude value, and/or energy value for brushing may be set on by a user operating oral hygiene device 10 and/or a user operating user device 150. The threshold frequency, amplitude, and/or energy value may be an upper or lower value such that if the determined brushing frequency, amplitude, and/or energy exceeds or is less than, respectively, the threshold frequency, amplitude, and/or energy value, the brushing motion of oral hygiene device 10 is incorrect, whereas if the determined brushing frequency, amplitude, and/or energy of oral hygiene device 10 is less than or greater than, respectively, the threshold frequency, amplitude, and/or energy value, the brushing motion of oral hygiene device 10 is correct.

As an illustrative example, a pre-set brushing frequency upper threshold value may be set at 5 Hz. If the frequency of the brushing motion is greater than 5 Hz, then the brushing motion is not correct. However, if the brushing motion has a frequency less than or equal to 5 Hz then the brushing motion is correct.

In one embodiment, a range corresponding to a lower and upper frequency, amplitude, and/or energy threshold value for correct brushing is used. As an illustrative example, a pre-set brushing frequency threshold range may be between 1 and 9 Hz. If the determined frequency of the brushing motion of oral hygiene device 10 is less than 1 Hz or greater than 9 Hz, then the brushing motion is incorrect. However, if the determined frequency of the brushing motion of oral hygiene device 10 is greater than or equal to 1 Hz but less than or equal to 9 Hz, then the brushing motion is correct.

If, at step 1812, the brushing frequency, amplitude, and/or energy meets the pre-set condition, the process 1800 proceeds to step 1814. For example, if the upper limit for the brushing frequency is 5 Hz, then proper brushing technique would correspond to the frequency of brushing of oral hygiene device 10 being less than or equal to 5 Hz. For scenarios where the pre-set condition is met, process 1800 proceeds to step 1814 where feedback is provided to a user operating oral hygiene device 10 indicating that their brushing motion is correct. For example, a user interface displayed on oral hygiene device 10, or user device 150 may indicate to the user that they are brushing their teeth 1304 correctly.

If, however, the brushing frequency, amplitude, and/or energy determined at step 1812 does not meet the pre-set condition, process 1800 proceeds to step 1816. At step 1816, feedback is provided to the user operating oral hygiene device 10 that informs the user that they are brushing their teeth incorrectly. For example, a user interface may be presented to the user on oral hygiene device 10, or user device 150. In one embodiment, haptic feedback, such as an audible tone or vibration of oral hygiene device 10, may be provided in response to it being determined that the frequency of the user's brushing motion is incorrect (e.g., does not meet the predefined condition for proper brushing motion). In one embodiments, both haptic and visual feedback are provided to the user operating oral hygiene device 10, however persons of ordinary skill in the art will recognize that any other additional type of feedback may be provided to the user, and the aforementioned are merely exemplary.

Figure 19:
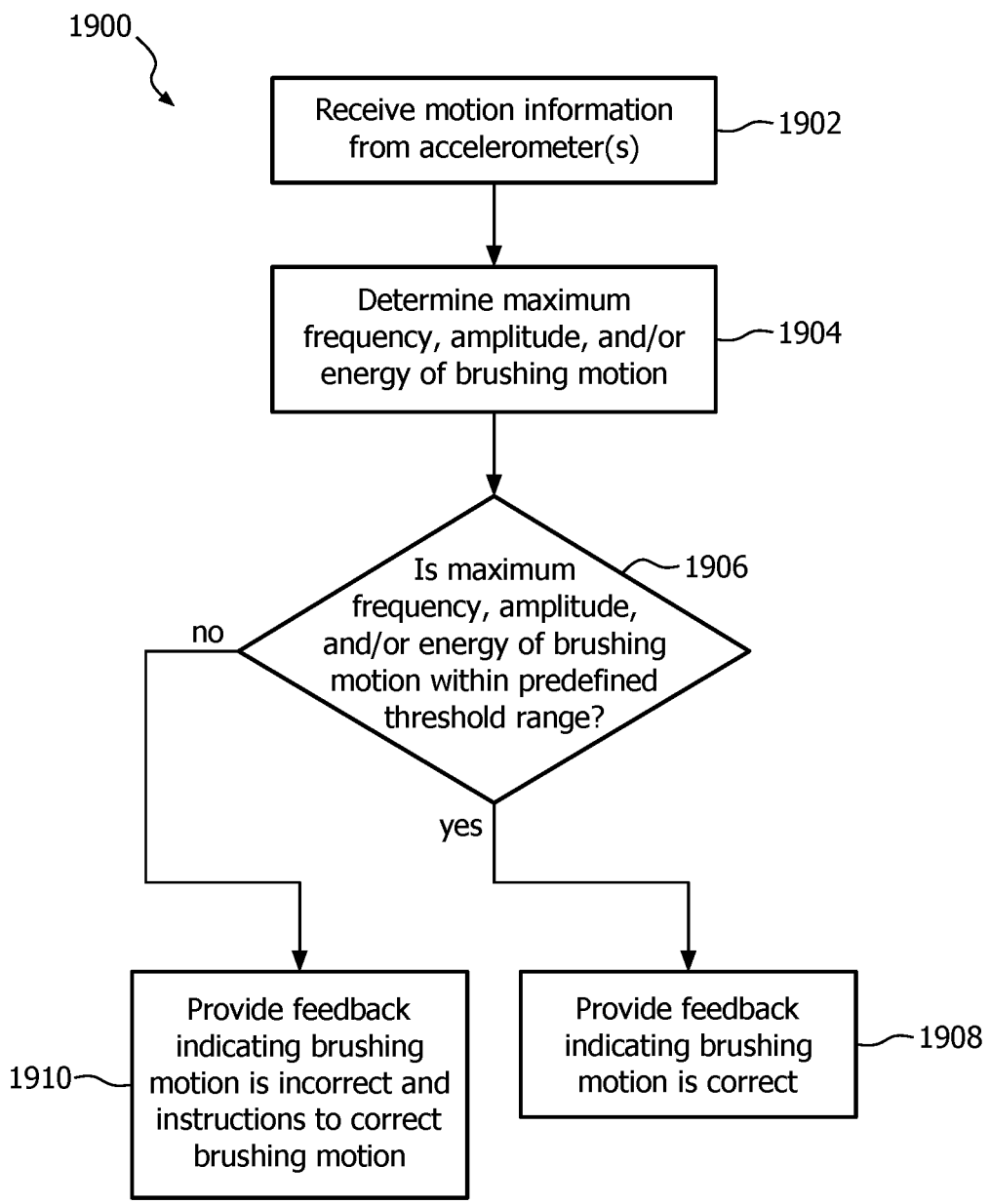
FIG. 19 is an illustrative flowchart of a process 1900 in accordance with various embodiments.

FIG. 19 is an illustrative flowchart of a process 1900 in accordance with various embodiments. Process 1900 begins, in one embodiment, at step 1902. At step 1902, motion information for oral hygiene device 10 is received from one or more accelerometer(s) (e.g., sensors 32) located on oral hygiene device 10. In one exemplary embodiment, step 1902 of FIG. 19 is substantially similar to step 1702 of FIG. 17, and the previous description applies.

At step 1904, a maximum frequency, amplitude, and/or energy of the brushing motion of oral hygiene device 10 is determined based on the motion information received from the accelerometers at step 1902. The received motion information from the accelerometers located on oral hygiene device 10 includes, amongst other information, frequency, amplitude, and/or energy information regarding the brushing motion of oral hygiene device 10. In one exemplary embodiment, the amplitude of the motion of oral hygiene device 10 is analyzed, and the maximum brushing amplitude is determined. In another exemplary embodiment, multiple maximum brushing amplitudes are determined. For example, a maximum brushing amplitude may be determined every 10 seconds or after a user moves oral hygiene device 10 to a different location within their mouth. In another exemplary embodiment, a maximum brushing amplitude, and the next few (e.g., five (5)) maximum brushing amplitudes are also determined at step 1904. For example, a maximum brushing amplitude is determined, and then the next maximum amplitude (e.g., an amplitude greater than all the other amplitudes except for the maximum amplitude) is determined, and so on. In yet another exemplary embodiment, an energy signal of the brushing motion may be analyzed, and a maximum energy signal may be determined From the maximum energy signal, a maximum frequency and/or amplitude may also be determined as the energy signal may include frequency and/or amplitude information.

In one embodiment, the amplitude of the signal detected by the one or more accelerometers is defined using Equation 1:

$$A = l/2(2\pi f)^2 \qquad \text{Equation 1}$$

where l is the displacement of housing 18, attachment assembly 20, and/or drive shaft 23 (depending on the amplitude being measured), and f is the frequency of the displaced objects movement. Persons of ordinary skill in the art will recognize that any other portion of oral hygiene device 10 may be used to measure an amount of displacement l, and the aforementioned is merely exemplary. As an illustrative example, if the displacement l=0.05 m, and the frequency f=2 Hz, then the amplitude will be approximately 3.95.

At step 1906, a determination is made as to whether or not the maximum frequency, amplitude, and/or energy of the brushing motion is within a predefined threshold range for brushing frequency, amplitude, and/or energy of oral hygiene device 10. In one embodiment, a predefined maximum frequency, amplitude, and/or energy for correct brushing motion is stored in memory 106 on oral hygiene device 100, or user device 150y. The maximum brushing frequency, amplitude, and/or energy determined at step 1904 is compared to the predefined maximum frequency, amplitude, and/or energy for correct brushing motion to determine if the determined maximum brushing frequency, amplitude, and/ or energy is within a range of the predefined maximum brushing frequency, amplitude, and/or energy. For example, if the predefined brushing amplitude is A, the range for the predefined maximum brushing amplitude may be A±10% of A. As another example, the predefined maximum brushing amplitude may be an upper or lower threshold, such that correct brushing motion corresponds to the maximum brushing amplitude being greater than or equal to A (if A is a lower threshold), or less than or equal to A (if A is an upper threshold).

If, at step 1906, it is determined that the determined maximum brushing frequency, amplitude, and/or energy of the brushing motion of oral hygiene device 10 is within the predefined threshold range, then process 1900 proceeds to step 1908. At step 1908, feedback is provided to the user indicating that the brushing motion is correct. For example, a user may be presented with user interface indicating that they are brushing correctly. If, however, at step 1906, it is determined that the determined maximum brushing frequency, amplitude, and/or energy is not within the predefined threshold range, then process 1900 proceeds to step 1910. At step 1910, feedback is provided to the user operating oral hygiene device 10 indicating that the brushing motion is incorrect, and instructions to correct the brushing motion are provided. For example, if a user has a brushing amplitude that is much smaller than the predefined threshold brushing amplitude, the user may be presented with a user interface on oral hygiene device 10 or user device 150 instructing the user to brush with a greater amplitude. As another example, if the user has a brushing amplitude that is much greater than the predefined threshold for maximum brushing amplitude, then the user may be presented with a user interface on oral hygiene device 10 or user device 150, instructing the user to decrease the amplitude of their brushing motion of oral hygiene device 10. In one exemplary embodiment, additional feedback, such as haptic feedback and/or audio feedback, are also provided to the user. For example, if the determined maximum brushing amplitude is smaller than, or greater than the predefined threshold range for the maximum brushing amplitude, then an audible tone may be outputted by user device 150 indicating to the user that their brushing motion is incorrect. In one exemplary embodiment, a first audio tone is outputted if the determined maximum brushing amplitude is too low, whereas a second audio tone is outputted if the determined maximum brushing amplitude is too high.

Figure 20:
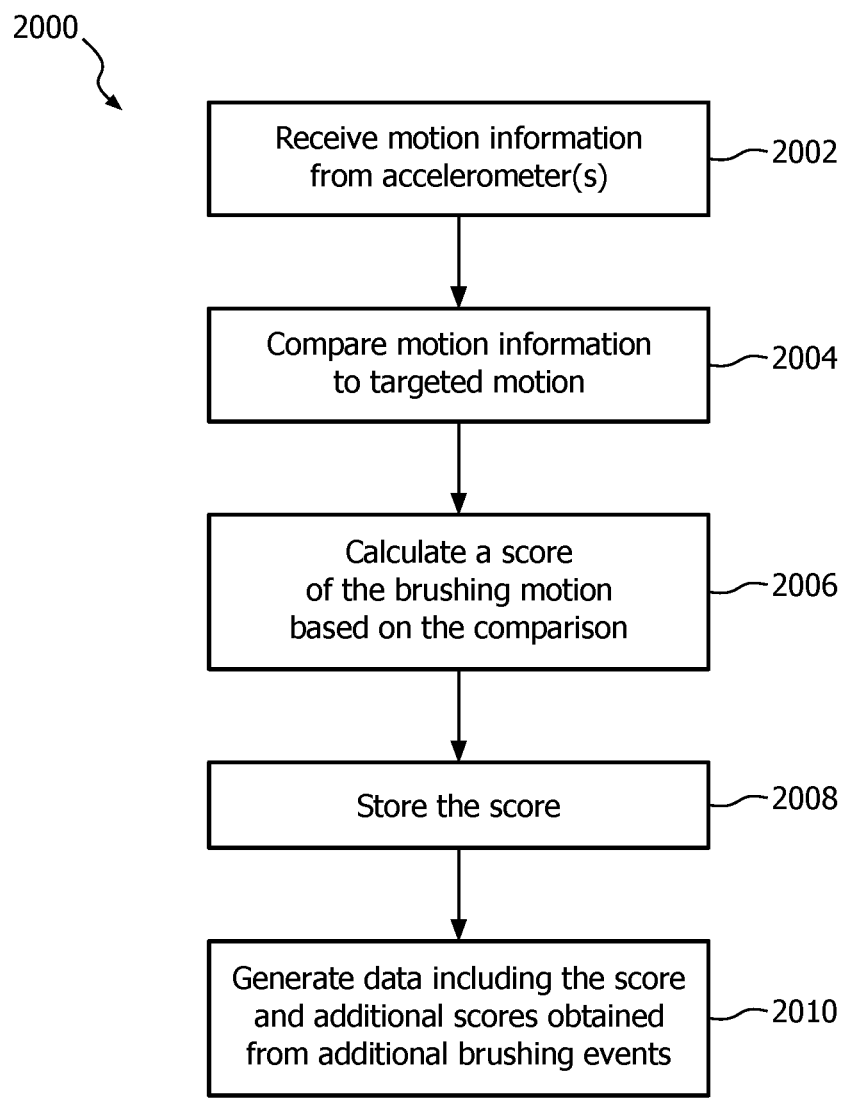
FIG. 20 is an illustrative flowchart of a process 2000 in accordance with various embodiments.

FIG. 20 is an illustrative flowchart of a process 2000 in accordance with various embodiments. Process 2000, in one embodiment, begins at step 2002. At step 2002, motion information is received from one or more accelerometers (e.g., sensors 32) located on oral hygiene device 10, 100. In one exemplary embodiment, step 2002 of FIG. 20 is substantially similar to step 1702 of FIG. 17, and the previous description applies.

At step 2004, the received motion information is compared to a targeted motion for oral hygiene device 10. In one embodiment, a frequency, amplitude, and/or energy corresponding to correct brushing technique is stored in memory 106 on oral hygiene device 10 or user device 150. Correct brushing technique thus refers to a targeted motion for oral hygiene device. For example, a predefined frequency for a targeted brushing motion of oral hygiene device 10 for a user is stored in memory 106. As another example, a range of frequencies for a targeted brushing motion for brushing a user's teeth using oral hygiene device 10 is stored in memory 106. The predefined frequency, amplitude, and/or energy, and/or the range of frequencies, amplitudes, and/or energies for the targeted brushing motion may be programmed into memory 106 by a dental professional, a parent or guardian of a user operating oral hygiene device 10, or by the user of oral hygiene device 10.

As an illustrative example, a predefined frequency range for a targeted brushing motion may be a frequency between 1 and 9 Hz. The received motion information includes, in one exemplary embodiment, a frequency of oral hygiene device 10 for a user's brushing. This frequency is then compared, at step 2004, to the targeted brushing motion frequency range (e.g., 1-9 Hz). In one embodiment, the comparison is performed on oral hygiene device 10, however persons of ordinary skill in the art will recognize that the comparison may instead, or additionally, be performed on user device 150.

At step 2006, a score is calculated based on the comparison between the received brushing motion information and the targeted brushing motion. Continuing the illustrative example above, if the frequency of the brushing motion is 1 Hz, the calculate score may be 100%. If the frequency of the brushing motion of oral hygiene device 10, 100 is instead 5 Hz, then the calculated score may be 50%. Thus, in this particular scenario, frequencies closer to 1 Hz are scored higher than frequencies scored closed to 9 Hz.

In one embodiment, the score is calculated on oral hygiene device 10, whereas in another embodiment, the score is calculated on user device 150. For example, received motion information (e.g., frequency of brushing) and the stored targeted brushing motion may be processed using processor(s) 102 of oral hygiene device 100 and/or user device 150. Processor 102 may analyze the brushing motion information obtained by the accelerometers on oral hygiene device 10 and compare the brushing motion information to the targeted brushing motion information. Processor 102 may then determine the difference between the two motions. For example, if the targeted motion information is between 1-9 Hz, the calculation may determine whether or not the received brushing motion information is within this range. If it is, a score may be generated based on predefined frequency values for the targeted motion. A frequency of 1 Hz may, in one illustrative example, correspond to a substantially perfect score (e.g., 100%), whereas a frequency of 5 Hz may correspond to an average score (e.g., 50%). If the targeted motion information is not within the range, the calculated score may reflect that the brushing motion is not within the targeted motion range (e.g., a score of 0%) or the score may indicate to the user that they are outside of the range and a score is not able to be computed (e.g., a score of not applicable may be presented or "outside targeted brushing motion range").

At step 2008, the calculated score is stored in memory/storage 106 on oral hygiene device 100 and/or user device 150. For example, each time a user operates oral hygiene device 10, the calculated score of their brushing may be stored. In one exemplary embodiment, a user may be able to select which instance or score is to be stored. For example, a user may be presented with the score at step 2006 (e.g., input/output circuitry 110 of oral hygiene device 10 or user device 150). In response to being presented with the score of that brushing session, the user may be provided with an option to store that score or not store that score. If the user decides to store the calculated score, then the score is stored in storage/memory 106. However, in one embodiment, this functionality may be capable of being disabled or locked such that certain users (e.g., children) are not able to have negative scores erased.

At step 2010, data including the score and any additional scores obtain from additional brushing events is generated.

In one embodiment, the generated data includes a timeline of a user's scores for each brushing session over time. For example, a graph including a calculated score for each brushing session may be presented within a display on user device 150. This allows a user, a user's parent or guardian, and/or a user's oral hygiene professional to view the user's progress. In this way, a user is able to see if their brushing technique is improving (e.g., becoming more aligned with the targeted motion) as they continue to use oral hygiene device 10, or if they are still deviating from the targeted motion and how they can modify their brushing technique to more closely achieve a brushing motion comparable to the targeted brushing motion. In one exemplary embodiment, the data generated includes scores for a user's various brushing sessions, and that data is transmitted (e.g., via email or to a remote storage platform) to the user's oral hygiene professional. This allows the user's dental professional to monitor the user's brushing technique between office visits. Furthermore, the oral hygiene professional will now be able to review the user's brushing motion technique and subsequent visits to help the user improve their brushing technique.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. An oral hygiene device operable to determine a quality of brushing by a user during a brushing session, the oral hygiene device comprising:
    a housing portion comprising a drive train assembly;
    an attachment assembly;
    memory;
    at least one accelerometer; and
    at least one processor operable to, during the brushing session:
        obtain information from the at least one accelerometer corresponding to a brushing motion of the oral hygiene device, the information corresponding to at least one of a frequency, an amplitude, and an energy of a brushing motion of the oral hygiene device;
        compare the obtained information corresponding to the at least one of the frequency, amplitude, and energy of the brushing motion of the oral hygiene device to a targeted frequency, amplitude, and/or energy of the brushing motion for the oral hygiene device stored within memory;
        calculate a difference between the at least one of the frequency, amplitude, and energy of the brushing motion of the oral hygiene device and the targeted frequency, amplitude, and/or energy of the brushing motion for the oral hygiene device;
        display on a display screen the calculated difference between the at least one of the frequency, amplitude, and energy of the brushing motion of the oral hygiene device and the targeted frequency, amplitude, and/or energy of the brushing motion for the oral hygiene device; and
        provide the user operating the oral hygiene device with instructions during the brushing session to modify a motion of the oral hygiene device such that additional information corresponding to the brushing motion of the oral hygiene device obtained from the at least one accelerometer during a remainder of the brushing session will be closer to the targeted motion of the oral hygiene device.

2. The oral hygiene device of claim 1, further comprising:
    communications circuitry that communicates to a user device at least one of:
        the obtained information corresponding to the at least one of the frequency, amplitude, and energy of the brushing motion of the oral hygiene device;
        the calculated difference between the at least one of the frequency, amplitude, and energy of the brushing motion of the oral hygiene device and the targeted frequency, amplitude, and/or energy of the brushing motion for the oral hygiene device; and
        the instructions to modify the motion of the oral hygiene device.

3. The oral hygiene device of claim 1, wherein the calculated difference for the brushing motion of the oral hygiene device is stored in the memory.

4. The oral hygiene device of claim 1, further comprising:
    an output interface operable to provide at least one of haptic feedback and visual feedback based on the calculated difference for the brushing motion of the oral hygiene device.

* * * * *